(12) United States Patent
Pozybill

(10) Patent No.: US 10,487,528 B2
(45) Date of Patent: Nov. 26, 2019

(54) BASE

(71) Applicant: Martin Pozybill, Stuttgart (DE)

(72) Inventor: Martin Pozybill, Stuttgart (DE)

(*) Notice: Subject to any disclaimer, the term of this patent is extended or adjusted under 35 U.S.C. 154(b) by 107 days.

(21) Appl. No.: 15/322,806

(22) PCT Filed: Jul. 6, 2015

(86) PCT No.: PCT/EP2015/065348
§ 371 (c)(1),
(2) Date: Dec. 29, 2016

(87) PCT Pub. No.: WO2016/005321
PCT Pub. Date: Jan. 14, 2016

(65) Prior Publication Data
US 2017/0130481 A1 May 11, 2017

(30) Foreign Application Priority Data
Jul. 8, 2014 (DE) .................. 10 2014 213 203

(51) Int. Cl.
*E04H 12/22* (2006.01)
*A47G 33/12* (2006.01)

(52) U.S. Cl.
CPC ......... *E04H 12/2246* (2013.01); *A47G 33/12* (2013.01); *E04H 12/2269* (2013.01); *F16M 2200/08* (2013.01)

(58) Field of Classification Search
CPC .............. A45B 2023/0012; A45B 3/00; A45B 2200/1009
USPC .... 248/519, 523, 128, 27.8, 346.01, 346.03, 248/346.05, 346.2, 346.5, 910; 47/66.6, 47/66.7; 220/475; 135/16, 15.1
See application file for complete search history.

(56) References Cited

U.S. PATENT DOCUMENTS

| | | | | | |
|---|---|---|---|---|---|
| 2,613,899 | A | * | 10/1952 | Wagner .................. | A47G 33/12 248/346.03 |
| 2,952,471 | A | * | 9/1960 | Thorpe .................. | A61G 13/00 191/1 R |
| 3,415,475 | A | * | 12/1968 | Goodman .............. | F16M 11/22 248/158 |

(Continued)

FOREIGN PATENT DOCUMENTS

| DE | 1834139 U | 7/1961 |
|---|---|---|
| DE | 1126761 B | 3/1962 |

(Continued)

OTHER PUBLICATIONS

International Search Report PCT/ISA/210 for International Application No. PCT/EP2015/065348 dated Sep. 4, 2015.

(Continued)

*Primary Examiner* — Terrell L McKinnon
*Assistant Examiner* — Michael McDuffie
(74) *Attorney, Agent, or Firm* — Harness, Dickey & Pierce, P.L.C.

(57) ABSTRACT

Disclosed is a base comprising a holding device for holding an object that is to be erected, the base having a receiving region for receiving a removable ballast weight in a receiving position. The receiving position lies radially outwards and starting from the receiving position, at least some sections of the base have a raised region arranged radially inwards in the direction of the periphery.

17 Claims, 41 Drawing Sheets

(56) References Cited

U.S. PATENT DOCUMENTS

| | | | | |
|---|---|---|---|---|
| 3,794,279 | A | * | 2/1974 | Kramer .............. E04H 12/2246 248/160 |
| 3,841,631 | A | * | 10/1974 | Dolan ................. A63B 71/023 108/15 |
| 4,145,044 | A | * | 3/1979 | Wilson ................ A63B 63/083 248/188.1 |
| 5,220,740 | A | * | 6/1993 | Brault .................. F16M 11/42 248/910 |
| 5,875,578 | A | * | 3/1999 | Grewe ............... G09F 15/0056 248/346.2 |
| 5,878,518 | A | * | 3/1999 | Grewe ............... G09F 15/0056 248/910 |
| 6,305,659 | B1 | * | 10/2001 | Metelski ............... F16M 11/42 248/519 |
| 6,869,058 | B2 | * | 3/2005 | Tung .................. E04H 12/2238 248/519 |
| 7,216,839 | B2 | * | 5/2007 | Xiaoqiu .............. E04H 12/2246 248/346.2 |
| 7,584,563 | B2 | * | 9/2009 | Hillstrom ........... G09F 15/0056 248/346.2 |
| 7,614,600 | B1 | | 11/2009 | Smith et al. |
| 8,807,513 | B2 | * | 8/2014 | Volin .................... A45B 23/00 135/16 |
| 8,876,076 | B2 | * | 11/2014 | Lee .................... F16M 11/105 211/26 |
| 8,919,361 | B2 | * | 12/2014 | Ma ..................... E04H 12/2238 135/16 |
| 8,968,047 | B1 | * | 3/2015 | Wicken ................ F16M 11/16 446/220 |
| 2001/0011695 | A1 | * | 8/2001 | Hill ....................... A45D 20/14 248/346.2 |
| 2001/0035485 | A1 | * | 11/2001 | Davis ................... A63B 71/023 248/346.2 |
| 2003/0145498 | A1 | * | 8/2003 | Venegas, Jr. ........ E04H 12/2246 40/607.1 |
| 2004/0056169 | A1 | * | 3/2004 | Harbaugh ........... E04H 12/2246 248/519 |
| 2004/0069922 | A1 | * | 4/2004 | Wu ..................... E04H 12/2246 248/519 |
| 2005/0189005 | A1 | | 9/2005 | Smith et al. |
| 2008/0224016 | A1 | * | 9/2008 | Defu .................. E04H 12/2246 248/523 |
| 2011/0000132 | A1 | | 1/2011 | Kamau |
| 2013/0146739 | A1 | * | 6/2013 | Zhao .................. E04H 12/2246 248/519 |

FOREIGN PATENT DOCUMENTS

| | | |
|---|---|---|
| DE | 3627084 A1 | 2/1988 |
| DE | 9213300 U1 | 3/1993 |
| DE | 29604992 U1 | 9/1996 |
| DE | 29819022 U1 | 1/1999 |
| EP | 0822305 A1 | 2/1998 |
| JP | 2004-205795 A | 7/2004 |
| WO | WO-2005/065279 A2 | 7/2005 |

OTHER PUBLICATIONS

Written Opinion of the International Searching Authority PCT/ISA/237 for International Application No. PCT/EP2015/065348 dated Sep. 4, 2015.

Office Action for Japanese Patent Application No. 2017-521298 dated May 7, 2019 and English translation thereof.

* cited by examiner

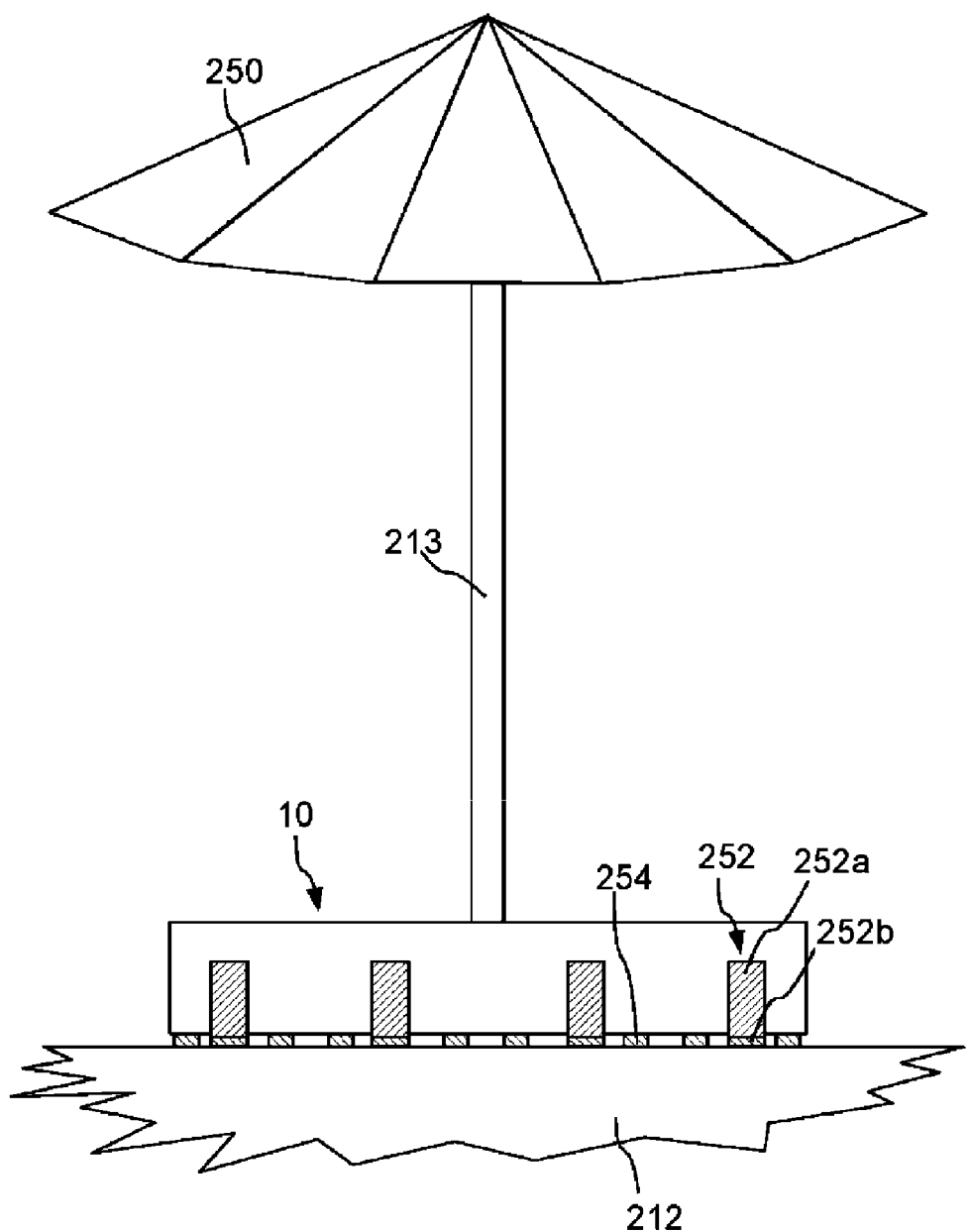

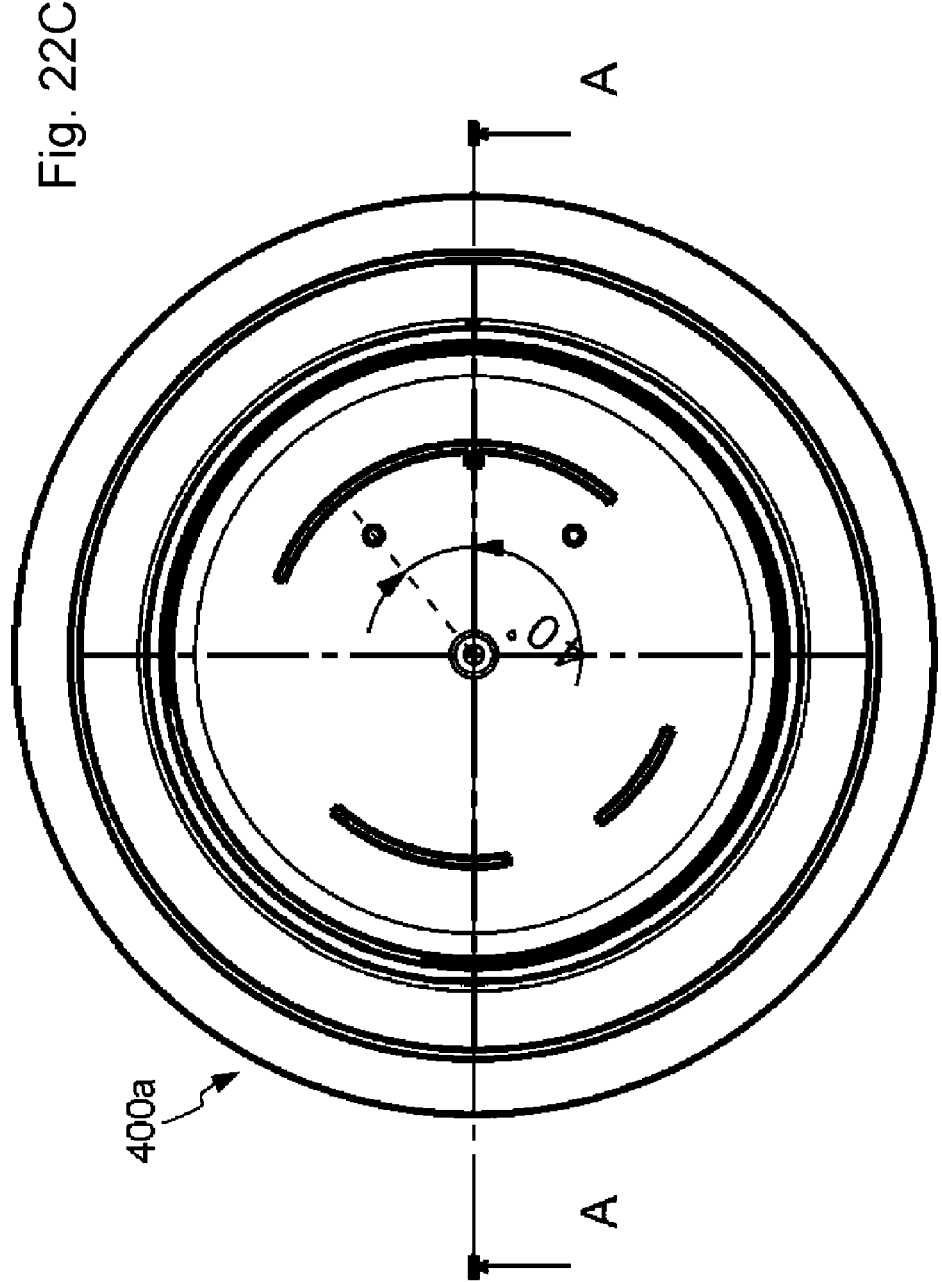

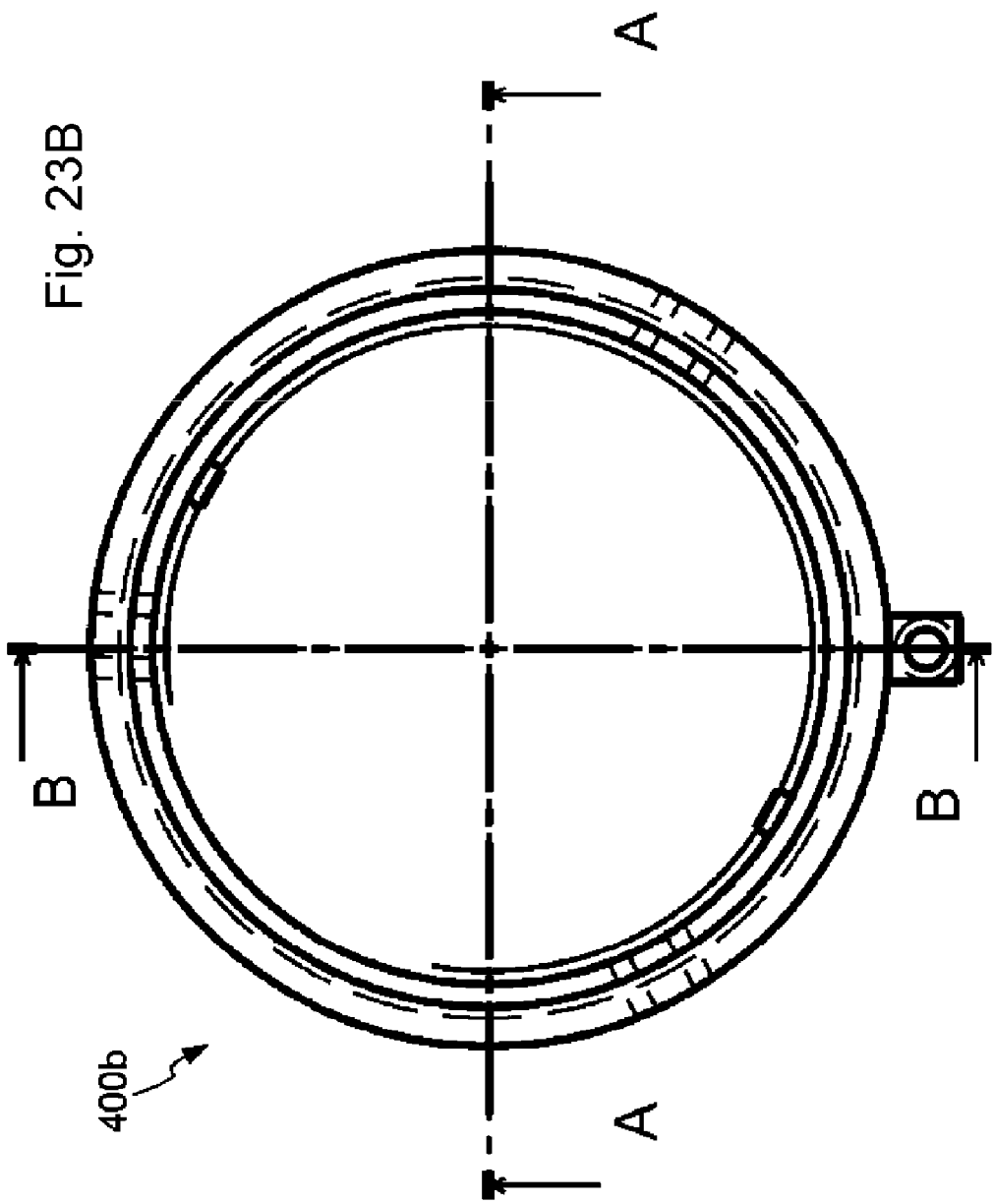

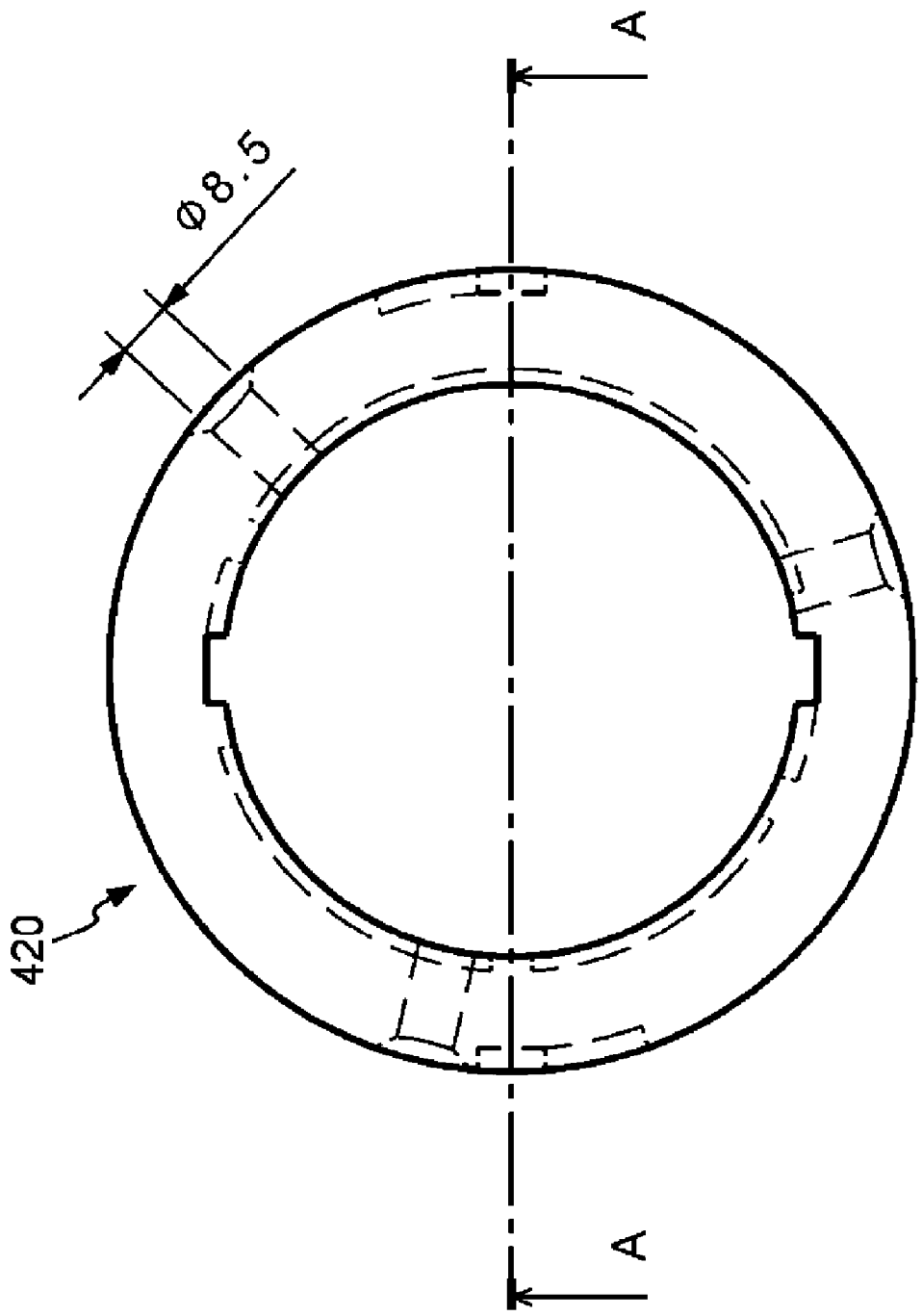

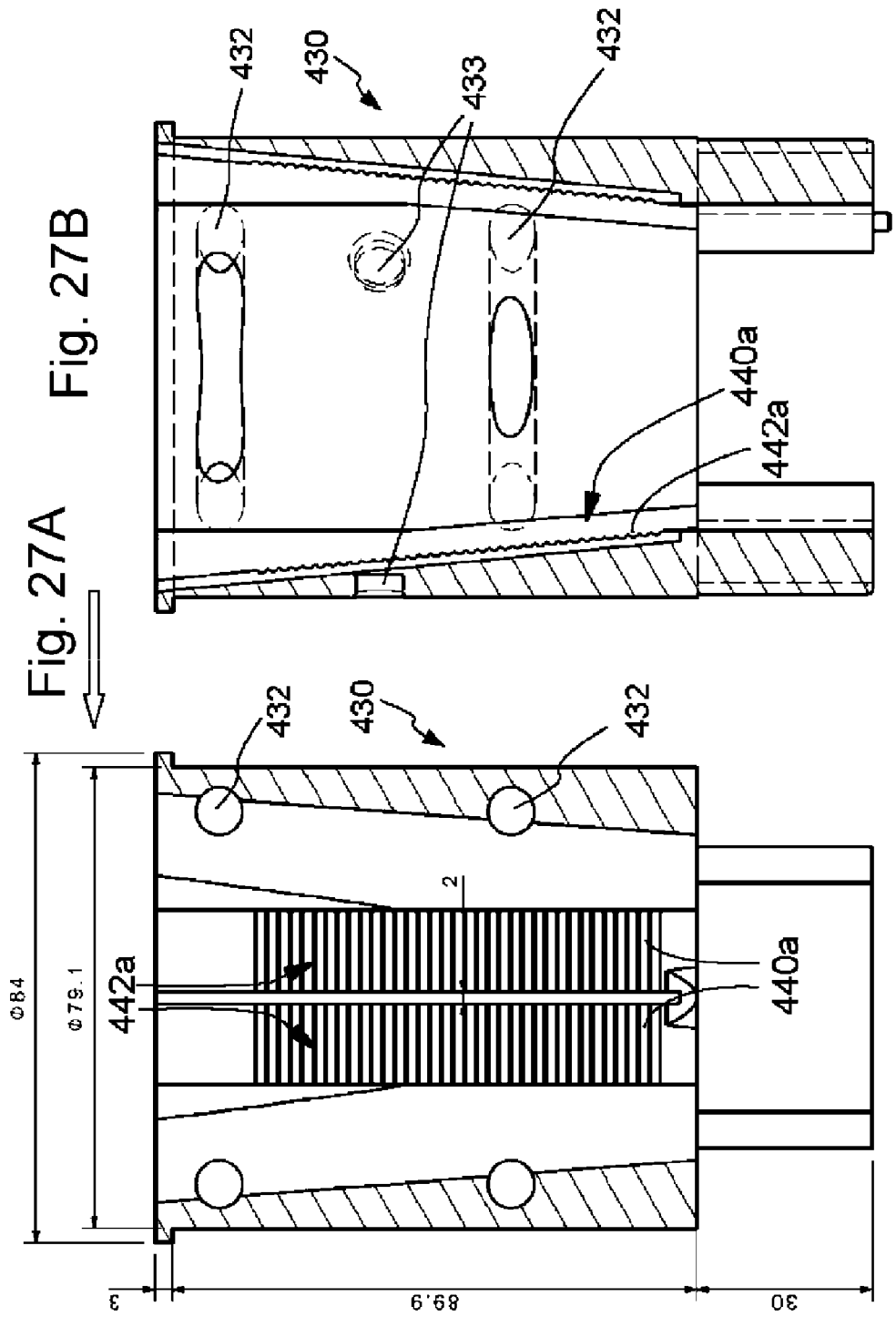

BASE

The invention relates to a base with a holding device for holding an object to be erected, with a receiving region for receiving a removable ballast weight in a receiving position. Such bases are, for example, used to erect umbrellas or Christmas trees. A ballast weight that can be used with the base serves to stabilize the base and increases its tilting moment. "Tilting moment" means the torque that must be applied in order to tip over the base with the object to be erected.

The underlying problem of the invention is solved by a base according to claim 1, as well as by a ballast weight according to the subordinate claims. Advantageous developments are mentioned in the dependent claims. Features important to the invention are furthermore found in the subsequent description and the drawings, wherein the features, both by themselves and in various combinations, can be important to the invention without explicitly being referenced again.

The present invention makes it possible to create a base that can be used in a highly flexible manner for various objects to be erected. The base according to the invention should furthermore be as convenient to transport as possible.

Preferably, the receiving position of the ballast weight is arranged radially to the outside, and a raised region is arranged, at least sectionally, in the peripheral direction radially to the inside proceeding from the receiving position. The raised region serves as means for determining the receiving position of the removable ballast weight. The designations "lying radially to the outside" and "lying radially to the inside" and "peripheral direction" are not to be understood as restrictive with regard to the shape of the base. The base can be designed to be circular; however, an oval shape, for example, is also in line with the invention, or shapes that substantially correspond to a polygon.

An arrangement of the receiving position lying as far as possible to the outside of the radial direction has an advantageous effect on the tilting moment or the stability of the base. Due to the raised region that, for example, can be designed in the form of a peripheral bead, the ballast weight used with the base can be secured against slipping in the receiving position. The raised region can also be formed by a stop surface, or an angled surface in one preferred embodiment.

It is particularly advantageous when the raised region comprises a transport surface that preferably borders the receiving region. A "transport surface" is to be understood as an area or surface by means of which a ballast weight to be received in the receiving region can be transported. This makes it possible to apply a ballast weight to the base without the ballast weight having to be directly inserted into the receiving position. The ballast weight can be placed on the transport surface at a suitable location on the base and then passes over the transport surface to the receiving position in the receiving region.

It has proven to be particularly advantageous when the transport surface is angled at an overall angle relative to a base side between 5° and 30°, preferably between 10° and 22°, and, in particular, between 12° and 18°. Such an angle, given suitable ballast weights, enables movement of the ballast weight that is at least supported by gravity, and preferably based upon gravity.

An advantageous development of the base according to the invention is characterized in that the transport surface basically has the shape of a lateral surface of a conical frustum. This represents an easy to produce, reliable, and effective embodiment of the transport surface.

In one advantageous embodiment of the base according to the invention, the base comprises an infeed region in which the ballast weight can be inserted, and which is designed such that the ballast weight moves across the transport surface into the receiving position under gravity after being inserted, preferably moving in a rolling and/or sliding manner into the receiving position. This makes it possible to conveniently and easily insert the ballast weight into the receiving region via the infeed region. Due to its weight, the ballast weight moves from the infeed region via the transport surface into the receiving position in the receiving region.

It is particularly advantageous when an insertion device is arranged between the holding device and the infeed region that has an insertion surface which basically has the shape of a lateral surface of a conical frustum and is angled overall relative to the base side between 7° and 35°, preferably between 12° and 25°, and, in particular, between 15° and 20°. The ballast weight can be introduced very easily and conveniently into the base using said insertion surface. The ballast weight then enters into the provided receiving position in the receiving region via the infeed region and transport surface.

It is furthermore advantageous if the base comprises a top element and a bottom element that are releasably or unreleasably connected to each other, and the top element borders the receiving region in the direction of a top side, and the bottom element borders the receiving region in the direction of a base side. The described two-part structure makes it possible to economically produce the base according to the invention. In addition, the base according to the invention is easy to assemble, given this design. The advantage of the receiving region being bordered by the top and bottom element is that a ballast weight received in the receiving position is largely protected from the influence of weather, since the receiving position is largely enclosed by the top and bottom element. This makes it possible to, for example, use materials that are not very weather resistant for producing a ballast weight.

Furthermore, it has proven to be advantageous when the base is substantially rotationally symmetrical, and preferably rotationally symmetrical to the holding device.

It is furthermore in line with the invention when the holding device is designed to receive holding inserts. The base according to the invention can be advantageously adapted to various objects to be erected by means of the holding inserts. For example, a holding insert can be designed in the form of a sleeve with an essentially cylindrical seating space open at the top side of the base, wherein the sleeve has at least one threaded bolt that can be screwed into the seating space. A holding insert can also be formed by an element with claws for gripping a trunk. The two above-described holding inserts can, for example, serve for erecting a Christmas tree. Another holding insert can be configured to accommodate an umbrella, wherein different holding inserts are conceivable for different umbrellas. It is also advantageous when a holding insert is formed by an adapter element (or adapter apparatus)—in particular, a hollow cylindrical adapter element—that is designed to hold the object to be erected. The object to be erected can thus be shoved into the adapter element (or the adapter apparatus), and the adapter apparatus can be inserted into the holding device.

An advantageous development of the base according to the invention is characterized in that at least one knob is arranged on the base side, wherein the knob preferably has a cylindrical recess for receiving a leveling element. A "leveling element" is to be understood as an element that can be fastened in the knob in at least two positions which are recessed to different extents. When setting up the base, the knob creates a distance between a surface on which the base is standing and a bottom side of the base, to enable the circulation of air and prevent the formation of mold. The leveling element can, for example, be designed in the shape of a pin and inserted at variable depths into the knob. This can compensate for unevenness in the surface on which the base is standing. Preferably, the base has several knobs which are arranged to be distributed on the base side—in particular, several knobs with leveling elements.

An advantageous development of the base according to the invention is characterized in that at least one compressible sliding element or support element is arranged on the base side, wherein the support element is designed such that, in an expanded or uncompressed state, it extends at least 3 mm, preferably at least 5 mm, and, in particular, at least 7 mm beyond a base side contour of the base and, in a compressed state, extends flush with the base side contour of the base. The compressed state is the state assumed by the support element when a ballast weight is received in the base in the receiving position. The expanded or uncompressed state is the state assumed by the support element when a ballast weight is not received in the base, i.e., when only the weight of the base acts upon the support element. The base side contour of the base is the contour of the base when looking at the base orthogonal to the base side, wherein any existing knobs and/or leveling elements are a part of the base.

In one preferred embodiment of the base, the support element is designed in the shape of a ring and is arranged in a recess formed in the base side of the base. Alternatively, it has proven to be advantageous when several support elements in the form of cylindrical pins are arranged on the bottom side of the base.

Advantageously, the support elements(s) is/are produced using a polymer material. It is further advantageous when the support element(s) have a coating that promotes sliding, preferably a ceramic-based coating, that is advantageously vapor-deposited on the base side surfaces of the support element, i.e., surfaces facing the ground on which the base is standing.

The material of the support element or support elements is advantageously selected so that the support element or support elements are compressed when a ballast weight is located in the receiving position, wherein the support elements, or the support elements in a compressed state, run flush with the base side contour of the base. In other words, the weight of the ballast weight compresses the support element or support elements such that the base sits on, for example, the knobs arranged on the base side.

It has proven to be advantageous when a projecting region is arranged on the base side, and a recessed region is arranged in the top side and is designed to be complementary to the projecting region, such that a projecting region of a substantially identical second base can be inserted in the recessed region, preferably in a form fit and/or force fit. This allows several of the bases according to the invention to be stacked on each other, which can increase the stability of the object to be erected in comparison with using an individual base. This enables particularly heavy objects to be erected, such as expansive umbrellas which are frequently used at restaurants.

An advantageous development of the base according to the invention is characterized in that a contact surface is formed in the area of the recessed region and is in contact with a projecting region of the substantially identical second base that is inserted in the base to direct forces to a base side of the base arising from the weight of the substantially identical second base, wherein the contact surface is preferably formed by a top side of the adapter element.

According to the invention, there is also a ballast weight, for weighing down one of the aforementioned bases, which is characterized in that it comprises a variety of individual weights or ballast elements that are flexibly connected or connectible to each other—preferably, a variety of substantially spherical, cylindrical, or drum-shaped ballast elements that are flexibly connected to each other. The ballast elements of the above-described embodiments of the ballast weight accordingly form a type of chain, whereby the ballast weight is easy to transport and can be advantageously introduced into the receiving position. When used with the above-described base, the described shape of the ballast weight enables the ballast weight to be easily inserted by means of the insertion device into the infeed region, and allows the ballast weight to be easily transported via the transport surface of the base.

It has proven to be particularly advantageous when at least two ballast elements are connected to each other by a connecting means, preferably when the ballast elements each have a through-hole, and an elongated—in particular, cord-like—connecting means is guided through the respective through-hole in the ballast elements. The above-described embodiment of the ballast weight represents a preferred implementation of a chain-like version of the ballast weight that is advantageous with regard to the handling and insertability of the ballast weight.

According to the invention, there is also a ballast weight, which comprises a metallic material, that preferably comprises a variety of ballast elements that are flexibly connected to each other, wherein at least one ballast element, and preferably, all of the ballast elements, comprise(s) a metallic material, preferably consisting of at least one metallic material. Metallic materials have a particularly high density and thereby enable with a small space requirement considerable stabilization of the base by the employed ballast weight.

Moreover, a base is in line with the invention that is according to one or more of the above-described embodiments with a ballast weight according to one or more of the above described embodiments, wherein the ballast weight is arranged in the receiving position. A stable setup of an object to be erected is achieved by combining the base according to the invention with the appropriate ballast weight according to the invention. The base achieves considerable tilting stability from the external arrangement of the ballast weight in the receiving position. When transporting the base according to the invention, the ballast weight can be removed from the receiving position, and the base and ballast weight can be transported separately from each other. This allows people to transport the base in an easy and convenient manner who would be physically incapable of transporting the base and ballast weight simultaneously.

A base with a ballast weight as described above is, moreover, in line with the invention when the ballast weight is arranged in the receiving position such that when viewing the base side, at least 80%, preferably 90%, and, in particular, 100% of the mass of the ballast weight is outside the inner circle, and a circle midpoint of the inner circle is a geometric midpoint of the holding device, and a diameter of the inner circle is at least 50%, preferably 60%, and, in particular, 65% of a diameter of an outer circle, and the outer circle is the smallest possible circle that completely surrounds the base when viewing the base side. Given the above-described arrangement of the receiving position, considerable stability of the base is achieved. This results from the high tilting moment which can be absorbed by the base due to the ballast weight being arranged in an advantageous manner. Since all the ballast weight is distant from the holding device, the stabilizing weight of the ballast weight is efficiently used. This allows a ballast weight with a low weight to be used with considerable tilting stability.

Advantageously, the base is produced using a polymer material—preferably, a single polymer material. This enables economical production in an injection molding process.

It is also in line with the invention when the top element and bottom element are connectible to each other using a sealing means such as a sealing ring, wherein the connection can be releasable or unreleasable. The receiving region is then, for example, designed to be watertight, so that the base can be filled with a solid ballast weight, or also with a flowable ballast means—preferably, water and/or sand.

In one embodiment, the base comprises at least one primary support element that has an elastically deformable first partial body, and at least one second partial body comprising a ceramic material that is arranged on the first partial body.

Furthermore, the base can comprise at least one secondary support element wherein, particularly in an unloaded state, the primary support element extends further out of a base plane of the base than the secondary support element.

Preferably, the primary support element is arranged on a base body, such as a housing, of the base. The first partial body faces the base body ("upward," so to speak), and the second partial body faces a bearing surface ("downward," so to speak). In particular, the elastically deformable first partial body can press (elastically) against the bearing surface. In both of the cited embodiments, the first partial body is designed to be comparatively soft, elastic, and yielding, and the second partial body is designed to be comparatively hard, solid, rigid, and smooth.

For example, the base comprises several primary support elements, such as five pieces. Due to the elasticity of the first partial body, the individual primary support elements can press against the bearing surface basically independently. Consequently, all of the support force of the base can be distributed comparatively evenly to the individual, primary support elements and thus compensate for any unevenness of the bearing surface. Given the described differentiated properties of the first and second partial body, the base can be designed to be particularly useful and comparatively robust and durable.

In another embodiment, the base comprises a support tube designed basically as a hollow cylinder that is arranged on the base concentrically to a longitudinal axis of the base. This can expand the possibilities of the base according to the invention. In particular, the support tube can be designed to be stable, as a holding tube of, for example, an umbrella.

Furthermore, the support tube can be held in the base by means of at least one adapter apparatus designed at least approximately as a hollow cylinder. Consequently, a support tube can, for example, also be arranged in the base with a deviating diameter.

Preferably, the support tube is held in the base in a form fit, wherein the support tube and/or the at least one adapter apparatus is held by means of at least one screwed connection in the base. Consequently, the support tube can be easily installed and removed.

In another embodiment, the base has a base surface provided for arranging on a bearing surface, and a receiving surface substantially opposite the base surface, wherein a receiving apparatus having a least one groove is arranged in the region of the receiving surface for receiving a hollow cylinder. By means of the groove, it is possible to easily arrange the hollow cylinder stably in the base. The hollow cylinder is preferably designed as a flexible and/or kinkable plate.

Furthermore, the base can comprise a hollow cylinder that is received in the receiving apparatus, wherein the base comprises a table top that is arranged on an end section of the hollow cylinder facing away from the base. The hollow cylinder is preferably arranged on the base concentrically to a longitudinal axis of the base. Accordingly, it is, for example, possible for the table top to be held by the hollow cylinder. In this embodiment, the use of the support tube described above can be unnecessary.

In another embodiment, the holding device comprises at least one adapter apparatus for holding the object to be erected, wherein the adapter apparatus has at least one radially acting clamping device, and wherein a radial dimension of the clamping device can be adjusted basically smoothly. Consequently, the object to be erected can have a specific outer diameter and nevertheless be held stably in the base.

Furthermore, the clamping device can comprise at least one first clamping element that can be coupled to the base—in particular, rigidly—wherein the clamping device comprises at least one second clamping element that can be arranged radially between the first clamping element and object to be erected, wherein the first clamping element has a first contact surface, and the second clamping element has a second contact surface, wherein the first and second contact surface touch at least sectionally, wherein, in particular, a touching surface comprises an area of at least about 20 mm$^2$. Consequently, the clamping device can be produced particularly economically and also can be used in a highly variable manner.

Furthermore, the first and/or second contact surface is preferably designed to be mostly flat, at least sectionally. For example, more than 90% of an overall surface of the first and/or second contact surface is designed to be flat. Accordingly, the clamping device can be produced very easily and economically.

Furthermore, the first and/or second contact surface can be designed to be substantially rectangular, wherein a width of the first and the second contact surface is smaller than a length of the first and the second contact surface, and wherein a longitudinal axis of the first and second contact surface preferably forms an angle with a longitudinal axis of the base between approximately 2° and approximately 45°—in particular, between approximately 5° and approximately 30°. A particularly suitable clamping device is characterized by this angle.

In one embodiment, at least one surface of at least one clamping element, preferably a surface of the second clamping element—in particular, a surface opposite the first or second contact surface—has a geometry of an Euler spiral, at least sectionally.

In another embodiment, a holding insert is arranged in the holding device of the base.

In another embodiment, the holding insert is designed as a hollow cylindrical adapter element.

In another embodiment, the object to be erected is arranged, or can be arranged, in an inner cavity of the hollow cylindrical adapter element.

In another embodiment, the object to be erected is arranged, or can be arranged, in the inner cavity in a force fit.

In another embodiment, the holding insert has a contact surface.

Furthermore, a projecting region can be arranged on the base side of the base, and a recessed region can be arranged in the top side and designed to be complementary to the projecting region such that a projecting region of a substantially identical second base can be inserted in the recessed region, preferably in a form fit and/or force fit, wherein holding inserts are arranged in the respective holding devices of the bases, and wherein the holding inserts have a contact surface, and wherein the contact surface of the first base is in contact with the projecting region of the second base.

Preferably, the contact surface is designed to conduct forces due to the weight of the second base to the base side of the first base.

In one embodiment, the holding insert is designed as a cylindrical sleeve that is formed with a substantially cylindrical seating space that is open toward the top side of the respective base. In one embodiment, the sleeve has at least one threaded bolt that can be screwed into the seating space.

In the following, examples of embodiments of the invention are described with reference to the drawing. In the drawing:

FIG. 20 shows an embodiment of a base and an object to be erected in a first state;

FIG. 22C shows a third view of the bottom threaded sleeve from FIG. 22A;

FIG. 23B shows a first radial view of the top threaded sleeve from FIG. 23A;

FIG. 24B shows a first radial view of the second adapter apparatus;

FIG. 27A shows a first axial sectional view along a line B-B from FIG. 27D of a third adapter apparatus for holding the object to be erected;

FIG. 27B shows a second axial sectional view of the third adapter apparatus corresponding to a line C-C from FIG. 27D;

The same reference numbers are used for functionally equivalent elements and sizes in all the figures, even in different embodiments.

Figure 1:
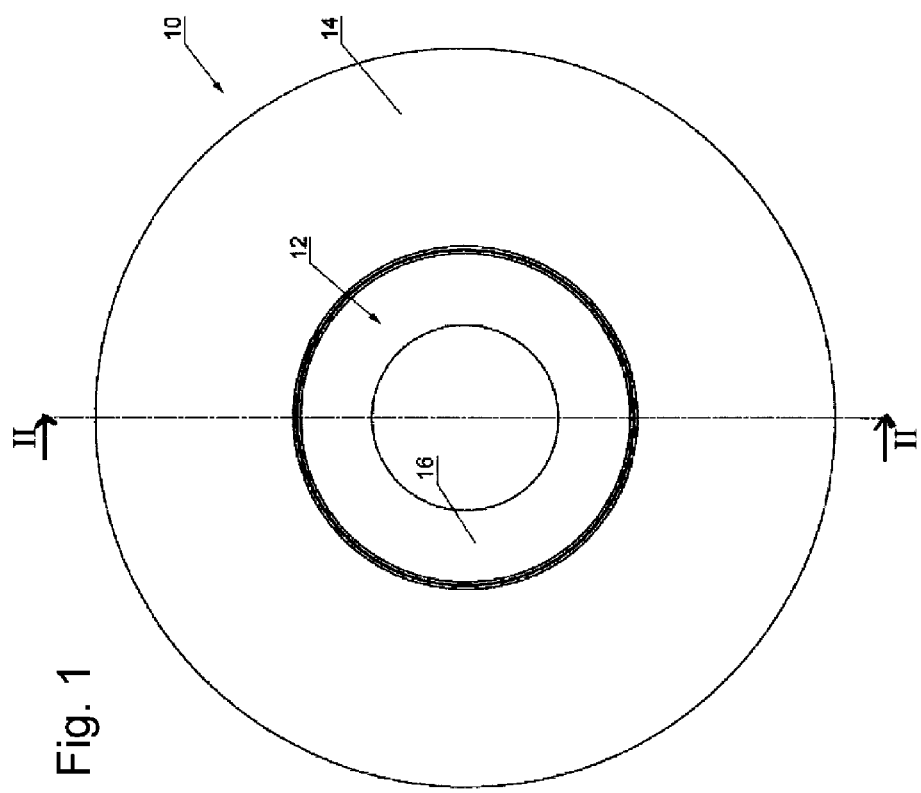
FIG. 1 shows a plan view of a base according to the invention.

A base 10 according to the invention depicted in FIG. 1 comprises a holding device 12 for receiving an object 250 to be erected (see FIG. 20). In the plan view shown in FIG. 1, primarily a top element 14 is visible. A bottom element 16 is only visible in the region of the holding device 12.

Figure 2:
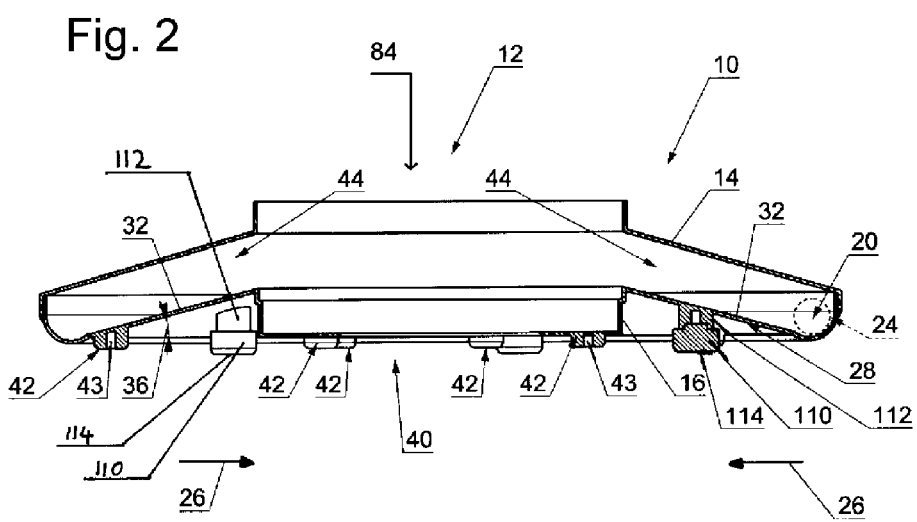
FIG. 2 shows a sectional view of the base from FIG. 1 corresponding to line II-II.

A sectional view of the base 10 along the line II-II is depicted in FIG. 2. In a receiving region 20, a receiving position 24 of a ballast weight 60 (not shown) (see, for example, FIG. 5) is schematically portrayed by a broken line. When the ballast weight 60 is received in the receiving region 20, it is in the receiving position 24. Viewed from the receiving position 24, a direction pointing radially to the inside is indicated by arrows 26. A raised region 28 is arranged radially to the inside of the receiving position 24.

FIG. 2 accordingly shows the base 10 with a receiving region 20 for receiving the removable ballast weight 60 in the receiving position 24, wherein the receiving position 24 is arranged radially to the outside, and the raised region 28 is arranged, at least sectionally, in the peripheral direction radially to the inside proceeding from the receiving position 24.

The raised region 28 comprises a transport surface 32 that borders the receiving region 20. The transport surface 32 basically has the shape of a lateral surface of a conical frustum. The transport surface 32 is angled at an angle 36 of about 17° relative to a base side 40 of the base 10.

Depending upon a respective design of the base 10, the transport surface 32 can be angled at an overall angle 36 relative to the base side 40 between 5° and 30°, preferably between 10° and 22°, and, in particular, between 12° and 18°.

The top element 14 and bottom element 16 are releasably or unreleasably connected to each other, wherein the top element 14 borders the receiving region 20 in the direction of a top side 84, and the bottom element 16 borders the receiving region 20 in the direction of a base side 40.

On the base side 40 of the base 10, knobs 42 are arranged that each have a cylindrical recess 43 for receiving a leveling element 136 not shown in FIG. 2. Said leveling elements 136 are further addressed below with regard to FIG. 11. Viewed from the raised region 28 or the transport surface 32, the base 10 comprises an infeed region 44 lying radially to the inside.

The base 10 has sliding elements or support elements 110 on its base side 40. The individual support elements 110 are each received in a socket 112 and thereby fastened in the base 10. The support elements 110 are produced from a polymer material. The polymer material is selected so that the individual support elements 110 are in an extended state when a ballast weight 60 is not received in the base 10. This expanded state is shown in FIG. 2. In the expanded state, the support elements 110 extend beyond the outer contours of the base 10. In other words, the base 10 stands on the support elements 110 when a ballast weight 60 is not received in the base.

Further below, an embodiment of the support element 110 is described, wherein the support element 110 is designed in a particularly sophisticated manner, and there designated as the primary support element 252; see also FIGS. 20 and 21.

If, in contrast, a ballast weight 60 is received in the base 10, the support elements 110 are compressed by the weight of the ballast weight 60. In this compressed state, the support elements 110 are flush with the outer contour of the base 10. In other words, the support elements 110 do not extend beyond the outer contours of the base 10. The base 10 accordingly stands on the knobs 42 or the leveling elements 136 if the leveling elements 136 are arranged in the cylindrical recesses 43 of the knobs 42.

A base side surface 114 of the support elements 110 is provided with a coating that promotes sliding. This coating comprises a vapor-deposited ceramic layer. This ceramic layer is resistant to wear from material abrasion and is simultaneously slippery, i.e., it has a low static and sliding friction coefficient.

Figure 3:
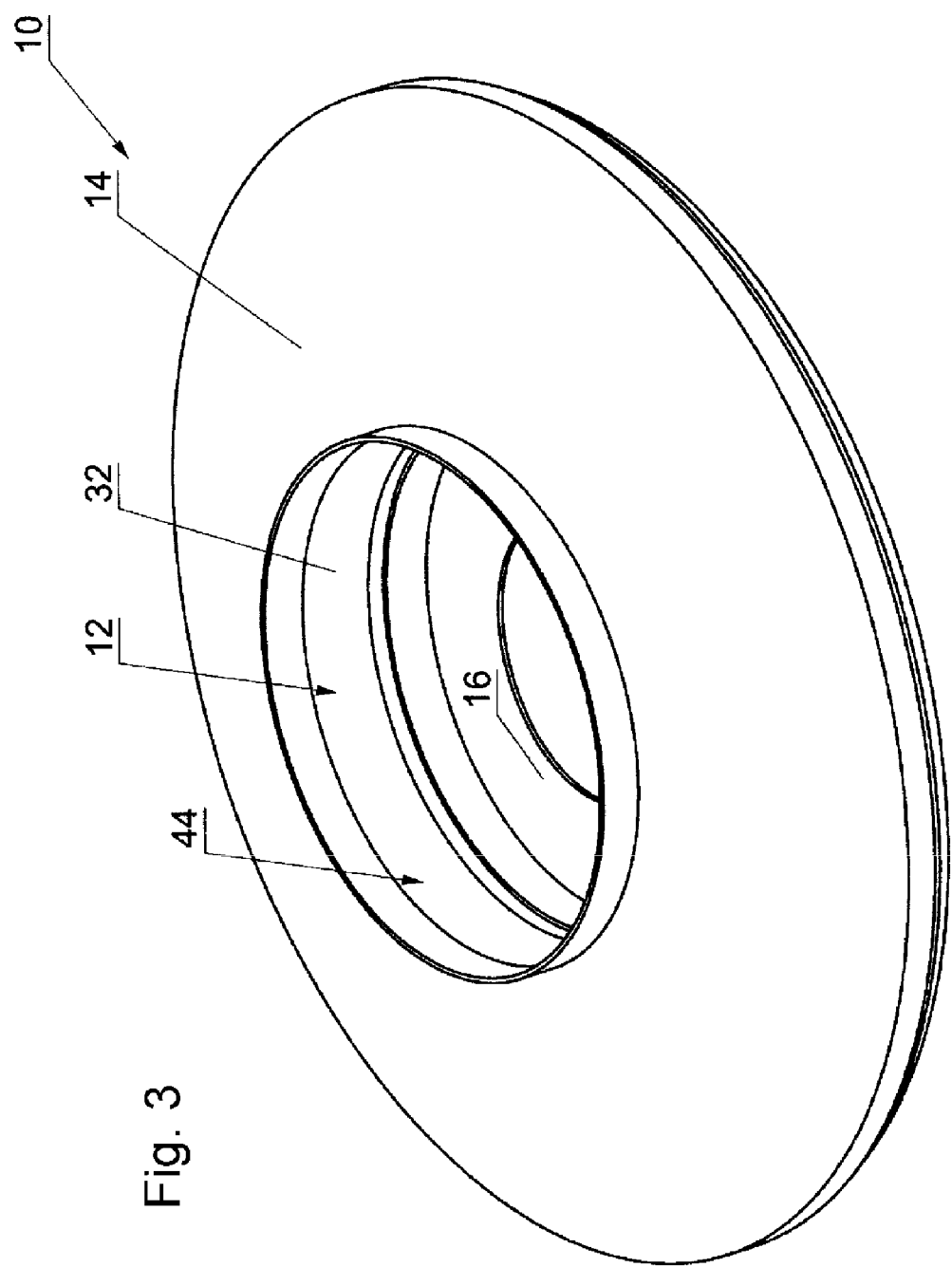
FIG. 3 shows a perspective view of the base from FIG. 1.
Figure 4:
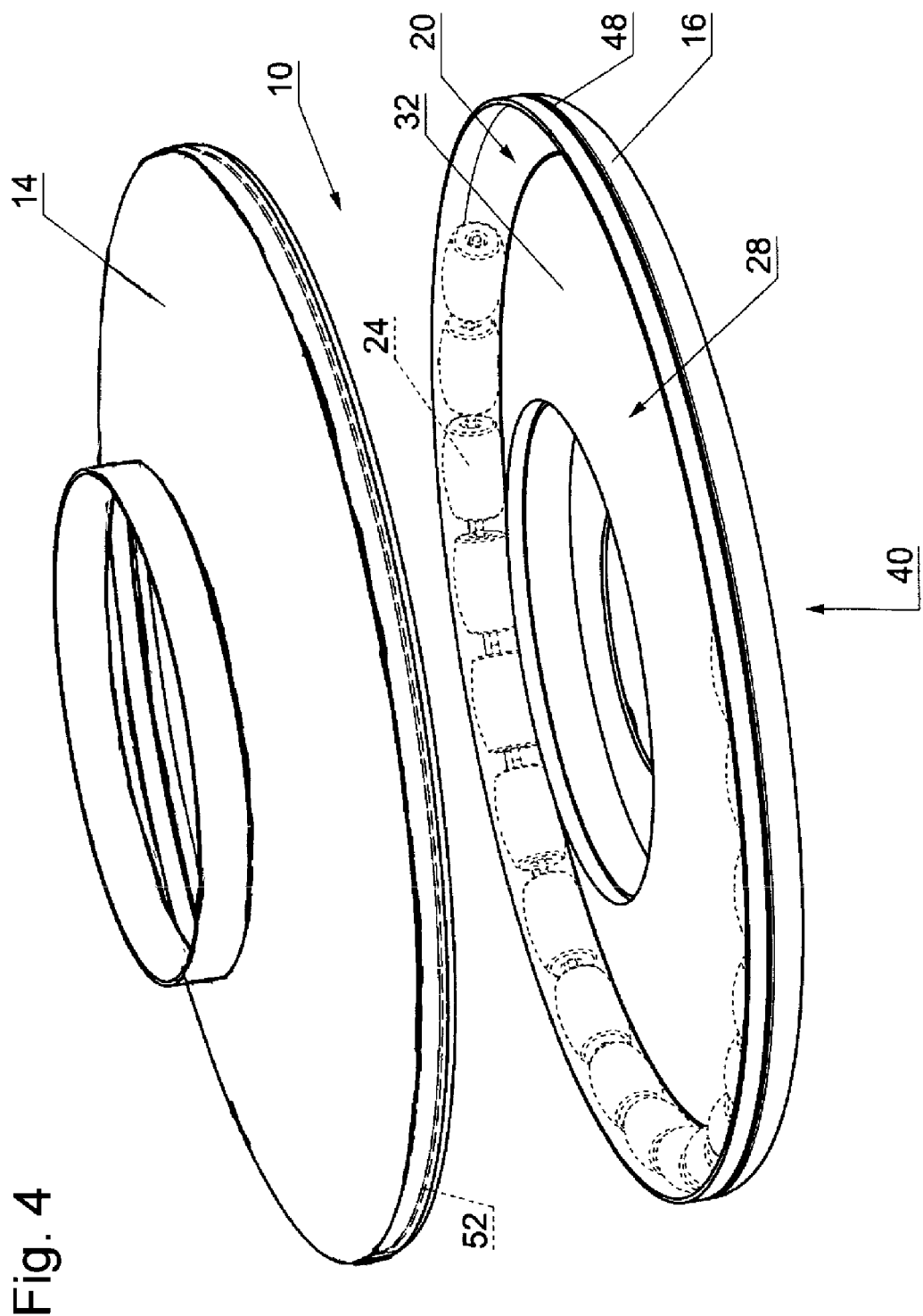
FIG. 4 shows a perspective view of the base from FIG. 1 in a disassembled state.

The base 10 is depicted in FIG. 4 in the perspective of a disassembled state, i.e., the top element 14 and bottom element 16 are separate from each other. In the preceding FIGS. 1-3, the top element 14 and bottom element 16 are depicted in a state of being connected to each other.

In the present example, the top element 14 and bottom element 16 are connectible with each other via a peripheral groove 48 arranged in the bottom element 16 and a peripheral projection 52 arranged on the inside of the top element 14 that is only schematically indicated in FIG. 4 by a dashed line. In the connected state, the peripheral projection 52 engages in the peripheral groove 48, whereby the top element 14 and the bottom element 16 are connected to each other in a force fit and form fit.

Figure 5:
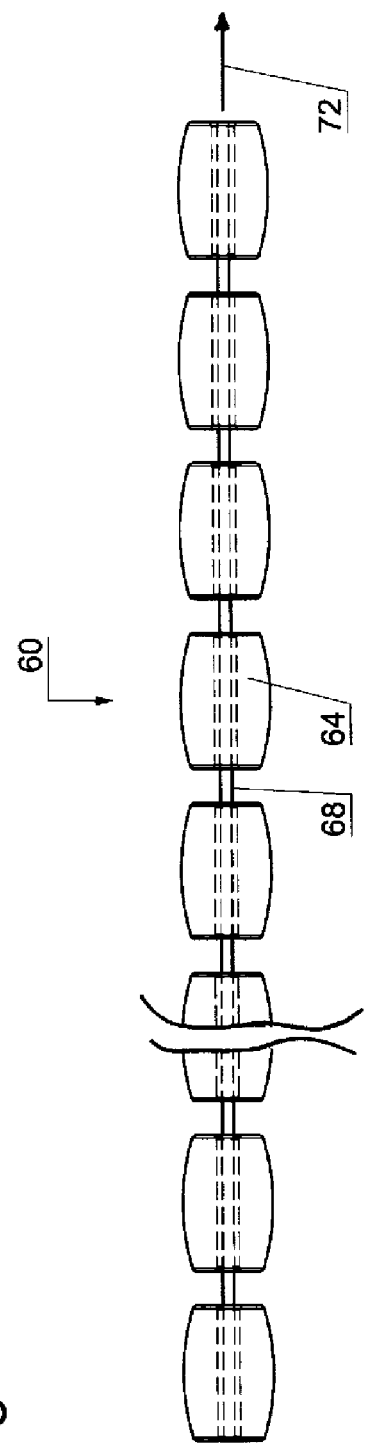
FIG. 5 shows a schematic side view of a ballast weight according to the invention for the base.

FIG. 5 shows a ballast weight 60 for weighing down the base 10 depicted in the previous figures. The ballast weight 60 comprises several individual weights or ballast elements 64, of which only one has a reference sign in FIG. 5. The ballast elements of 64 are connected to each other by an elongated connecting means 68 designed like a cord in the present case. Cord-like in this context means a structure of the connecting means 68 that permits flexibility or deformability of the connecting means 68 orthogonal to its extension in its longitudinal direction, which is indicated by the arrow with reference sign 72. Moreover, the connecting means 68 can also be deformable in the longitudinal direction. However, this is not essential within the meaning of the term "cord-like." Accordingly, a connecting means 68 also falls under the term "cord-like" that is rigid in the longitudinal direction, yet flexible orthogonally to the longitudinal direction.

Preferably, the ballast weight 60 comprises a variety of ballast elements 64 that are flexibly connected or connectible to each other—preferably a variety of substantially spherical, cylindrical, or barrel-shaped ballast elements 64 that are flexibly connected to each other. Alternatively, any other rollable embodiments can be used for the ballast elements 64. A ballast element 64 of the ballast weight 60 is shown in an enlarged perspective view in FIG. 6. In the present case, the ballast element 64 is designed to be barrel-shaped.

Along its imaginary longitudinal axis 74, the ballast weight 60 has a through-hole 76. The through-hole 76 serves to accommodate the connecting means 68 so that several ballast elements 64 can be threaded, as it were, on the connecting means 68 to form a ballast weight 60. Preferably, the connecting means 68 has local peripheral expansions that space the ballast elements 64 apart from each other.

Figure 6:
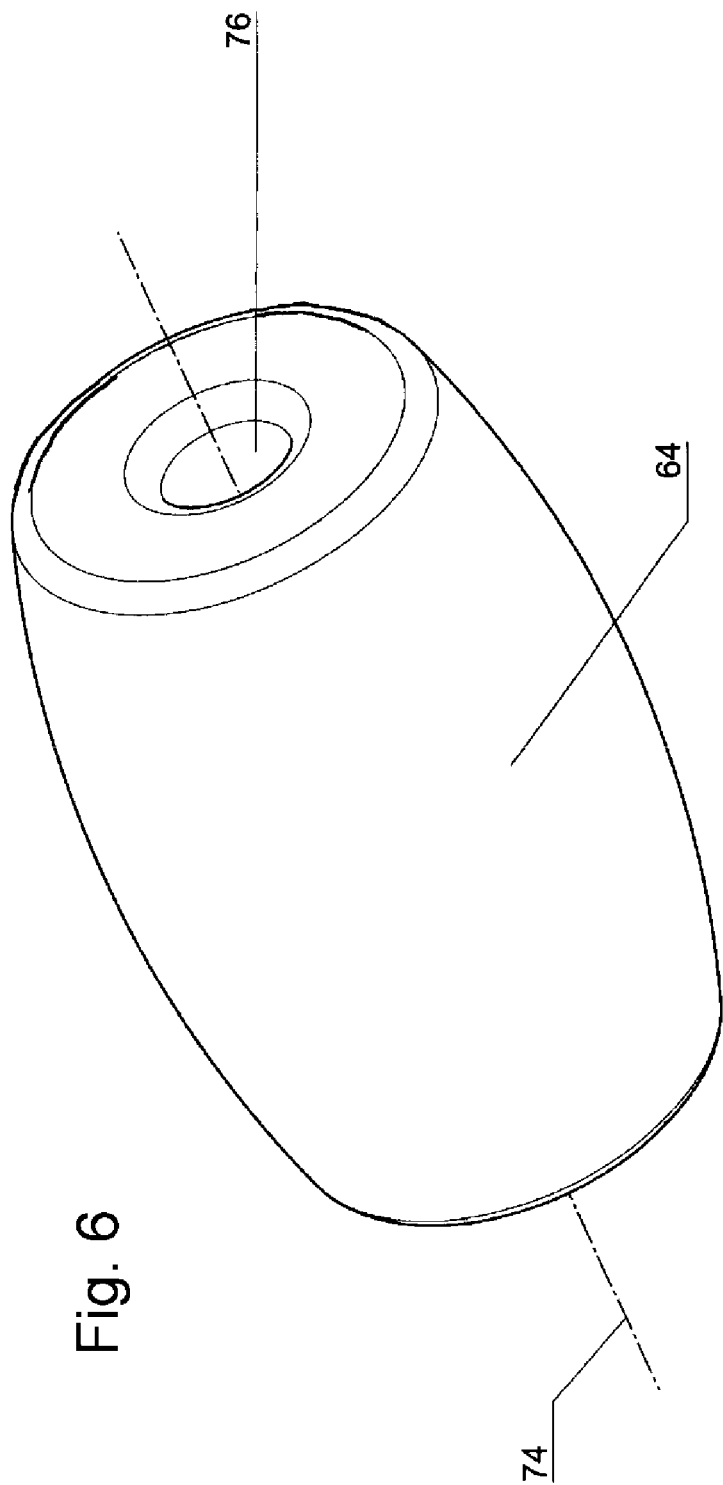
FIG. 6 shows a perspective view of a single weight or ballast element of the ballast weight from FIG. 5.

The ballast elements 64 of the ballast weight 60 in FIG. 5, and thus the ballast element 64 in FIG. 6 as well, consist of a metallic material. It is also in line with the invention when the ballast weight 60 comprises a metallic material— preferably, when the ballast weight 60 comprises a variety of ballast elements 64 that are flexibly connected to each other, and at least one ballast element 64, and preferably all of the ballast elements 64, comprises or comprise a metallic material.

Figure 7:
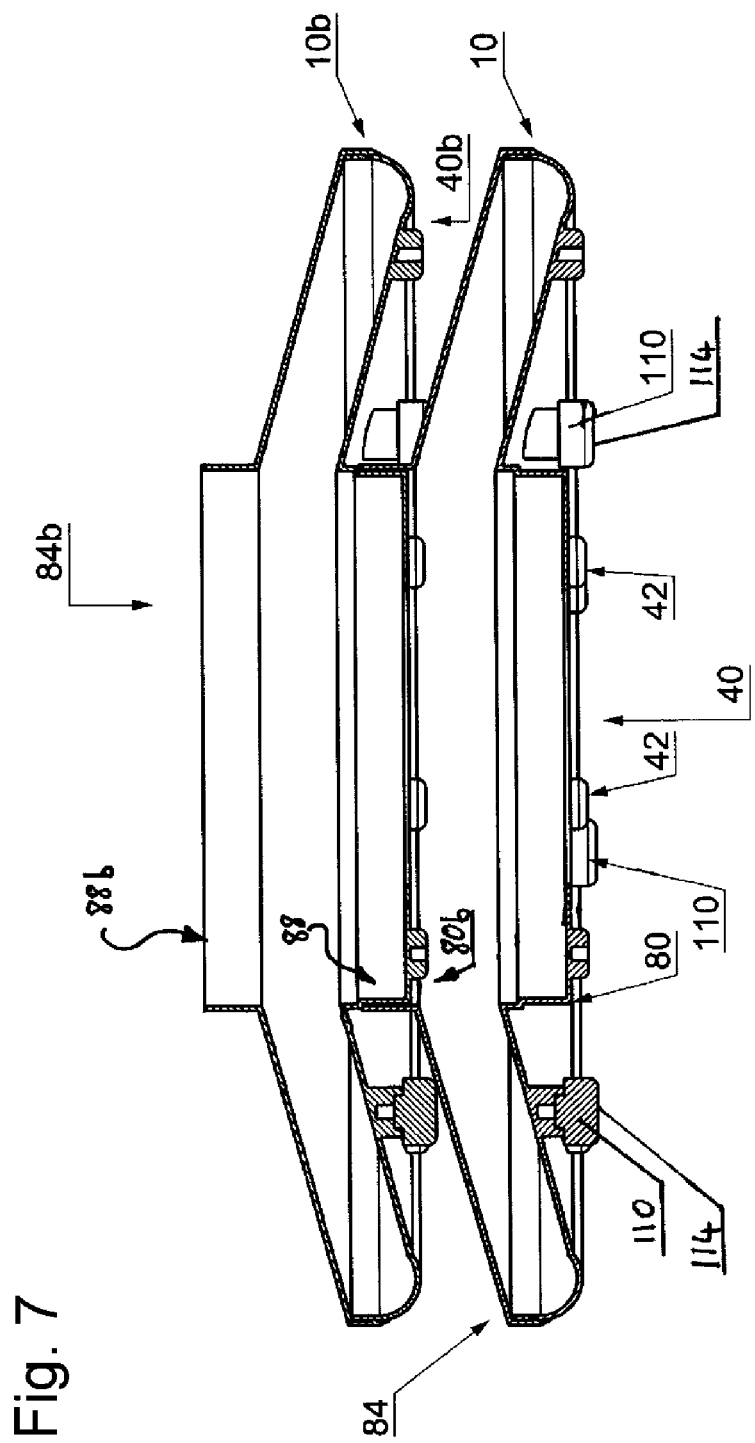
FIG. 7 shows an arrangement of the base according to the invention with another base that is basically identical.

FIG. 7 shows the base 10 from FIGS. 1 through 4, as well as an identical base 10*b* that is connected to the base 10. The elements of the base 10*b* corresponding to the elements of the base 10 have corresponding reference numbers to the index b.

The connection between the base 10 and the identically designed base 10*b* is realized by a projecting region 80*b* formed on the base side 40*b*, and a recessed region 88 formed on the top side 84 opposite the base side 40. The recessed regions 88, 88*b* are designed to be complementary to the projecting regions 80, 80*b*. In this context, complementary means that the projecting region 80, 80*b* of one base 10 or 10*b* can be inserted in the recessed region 88, 88*b* of the other base 10*b* or 10, preferably in a form fit and/or force fit.

Figure 8:
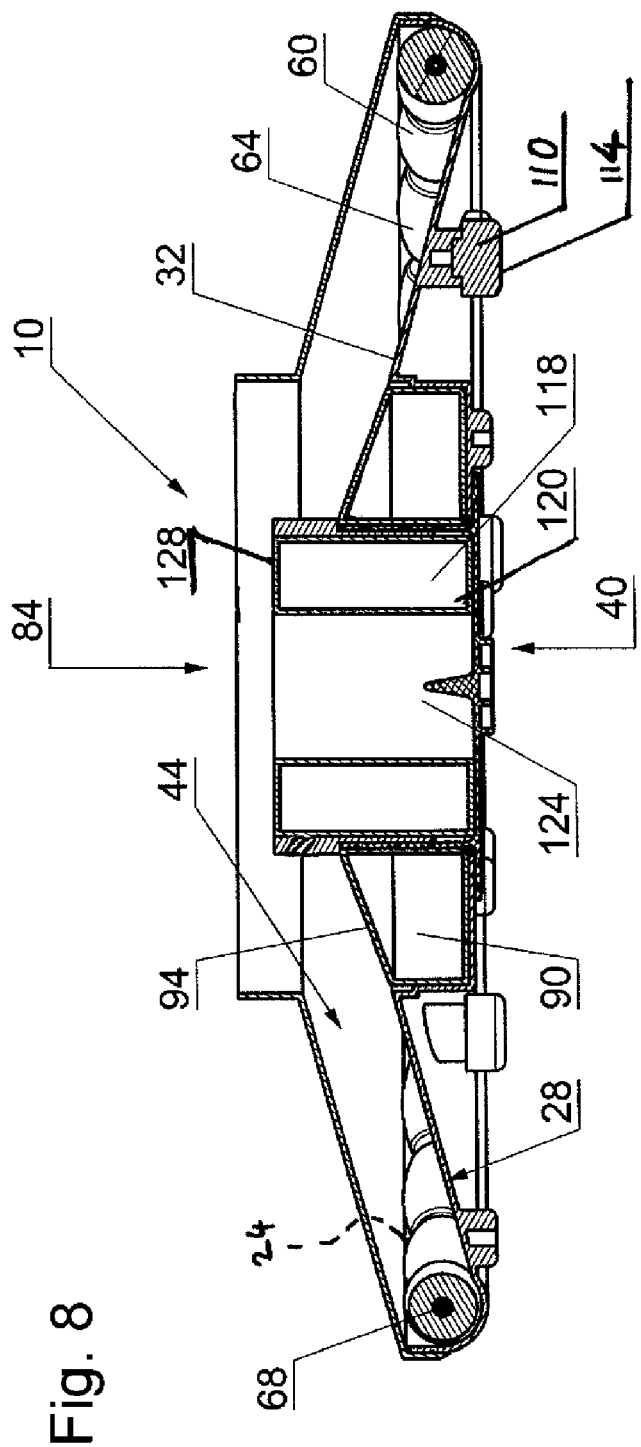
FIG. 8 shows a base according to the invention with a ballast weight received in a receiving position.

FIG. 8 shows the base 10 with the ballast weight 60, wherein the ballast weight 60 is received in a receiving position 24 in the receiving region 20. The ballast weight 60 is held by the raised region 28 in the receiving position 24.

The ballast weight 60 can be introduced into the infeed region 44 by means of an insertion device 90. The insertion device 90 has an insertion surface 94 on which the ballast weight 60 can be placed. After being placed on the insertion surface 94, the ballast weight 60 moves under gravity across the transport surface 32 and thereby into the receiving position 24. Under gravity, the ballast weight 60 rolls, as it were, with its barrel-shaped ballast elements 64 over the insertion surface 94 and transport surface 32 into the receiving position 24.

Preferably, the insertion surface substantially has the shape of a lateral surface of a conical frustum and is angled overall relative to the base side 40 at an angle between 7° and 35°, preferably between 12° and 25°, and, in particular, between 15° and 20°.

Figure 9:
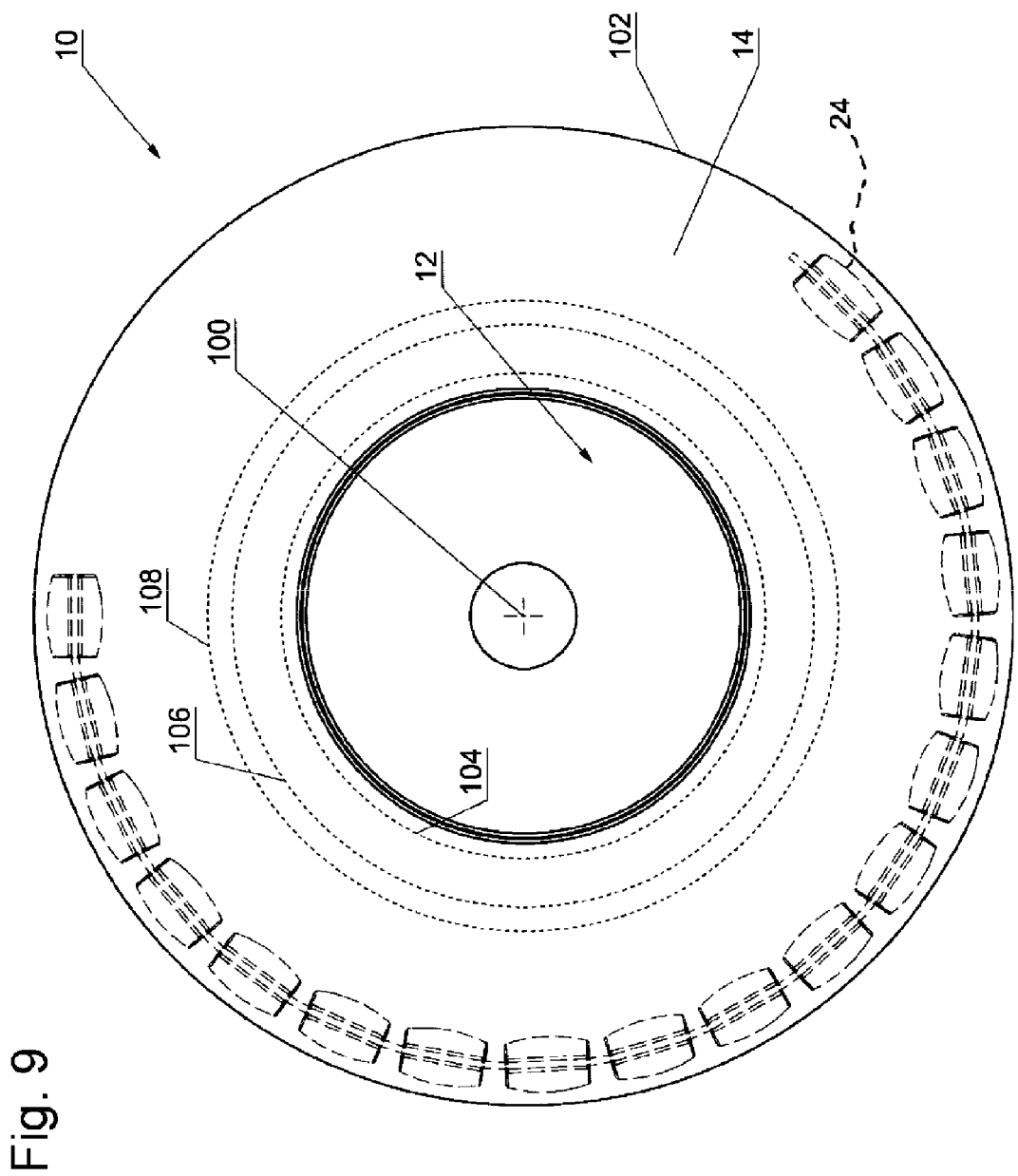
FIG. 9 shows a plan view of the base in which the position of the ballast weight is further clarified.

FIG. 9 shows a depiction of the base 10 corresponding to FIG. 1. In FIG. 9, a geometric midpoint 100 of the holding device 12 is also depicted. An outer circle 102 is the smallest possible circle that completely surrounds the base 10 in a view of the base side 40. Due to the rotationally symmetrical design of the base 10, the outer circle 102 coincides in the present example with the outer contour of the base 10. However, that is not necessarily the case with other, differently shaped embodiments of the base 10 according to the invention.

A first inner circle 104 has a diameter that corresponds to 50% of the diameter of the outer circle. A second circle 106 has a diameter that corresponds to 60% of the diameter of the outer circle 102, and a third inner circle 108 has a diameter that corresponds to 65% of the diameter of the outer circle 102. The receiving position 24 for a ballast weight 60 is situated such that the complete ballast weight 60, and thus 100% of its mass in the present exemplary embodiment, lies outside of the three inner circles 104, 106, and 108. The midpoint of the inner circles 104, 106, and 108 corresponds to midpoint 100 of the holding device 12.

Due to the rotationally symmetrical design of the base 10, the midpoint of the outer circle 102 also corresponds to the midpoint 100 of the holding device 12. In differently shaped embodiments of the base 10 according to the invention, coincidence of the midpoint 100 of the holding device 12 and the midpoint of the outer circle 102 is not necessarily the case.

Preferably, the ballast weight 60 is arranged in the receiving position 24 such that when viewing a base side 40, at least 80%, preferably 90%, and, in particular, 100% of the mass of the ballast weight 60 is outside the inner circle 104, 106, 108, and a circle midpoint of the inner circle 104, 106, 108 is a geometric midpoint 100 of the holding device 12, and a diameter of the inner circle 104, 106, 108 is at least 50%, preferably 60%, and, in particular, 65% of a diameter of an outer circle 102, and the outer circle is the smallest possible circle 102 that completely surrounds the base 10 when viewing the base side 40.

Figure 10:
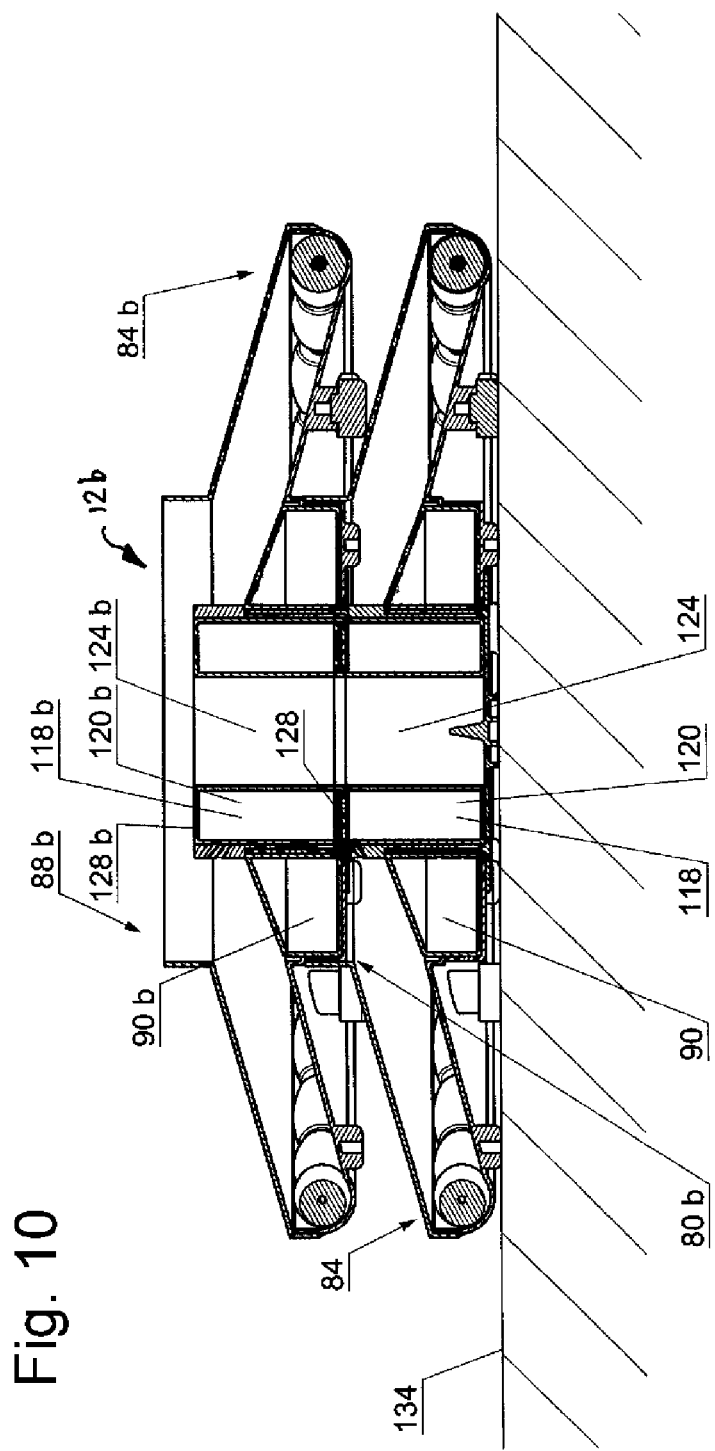
FIG. 10 shows an arrangement similar to FIG. 7, wherein the bases comprise adapter elements.

FIG. 10 shows a base 10 as well as an identical base 10*b* that is connected to the base 10. Holding inserts 118, 118*b* are received in the respective holding devices 12, 12*b* of the bases 10, 10*b*. In FIG. 10, the holding inserts 118, 118*b* are designed as hollow cylindrical adapter elements 120, 120*b*. An object 250 to be erected can be inserted or shoved into the inner cavity 124, 124*b*. This insertion is preferably a force fit. The object 250 to be erected can, because of this, be advantageously fixed in the base 10 according to the invention. The holding inserts 118, 118*b* each have a contact surface 128, 128*b*. In the configuration shown in FIG. 10, the contact surface 128 is in contact with the projecting region 80*b* of the second substantially identical base 10*b*. The contact surface 128 is designed to deflect forces due to the weight of the substantially identical second base 10*b* to the base side 40 of the base 10. The forces then act on the ground on which the base 10 is sitting.

The design of the holding inserts 118, 118*b* as adapter elements 120, 120*b* is to be understood only as an example. An alternative embodiment in the form of a sleeve is conceivable, with an essentially cylindrical seating space open at the top side of the base 10 or 10*b*, wherein the sleeve has at least one threaded bolt that can be screwed into the seating space. A Christmas tree to be erected can, for example, be thereby fixed by screwing in the threaded bolt in the sleeve and, accordingly, erected in the base 10.

Figure 11:
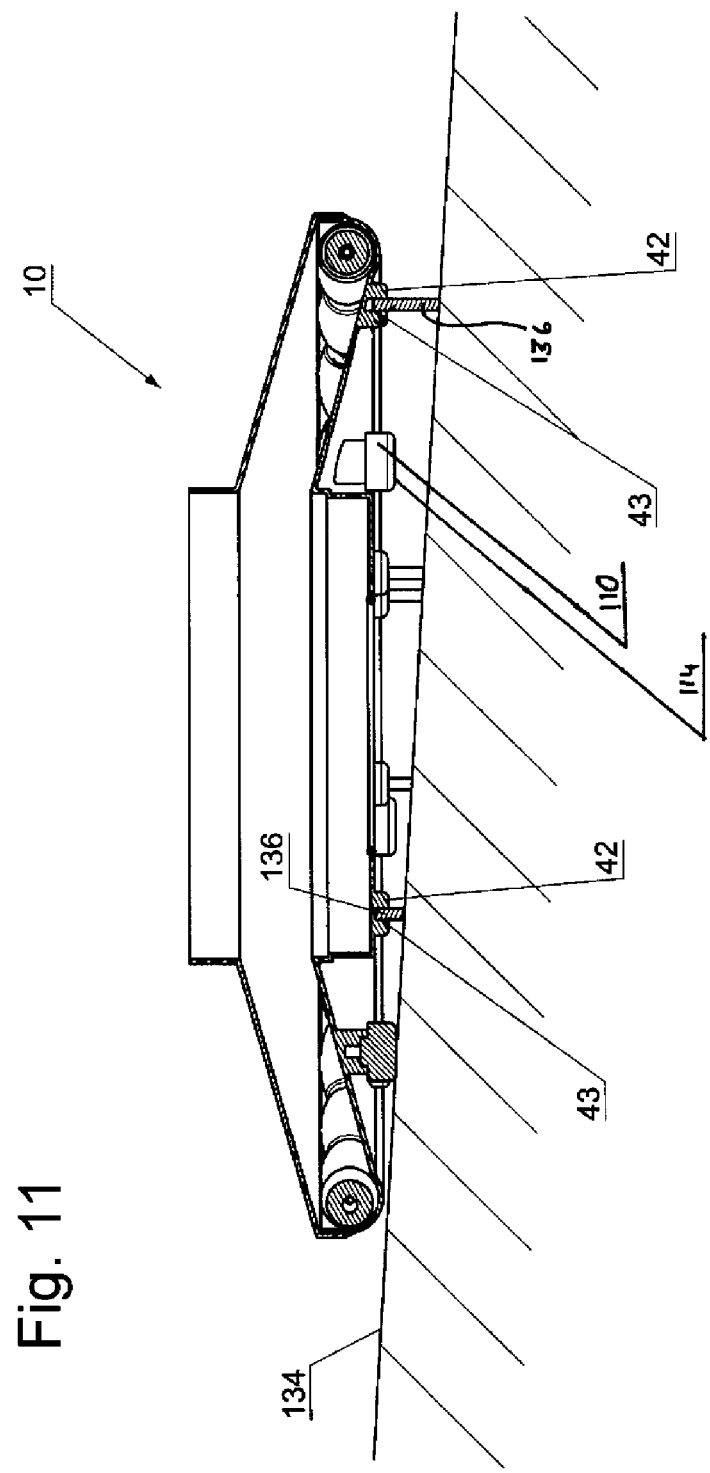
FIG. 11 shows a base that is erected by means of leveling elements on an angled surface.

FIG. 11 shows a base 10 that is set up on an angled surface 134. In order to compensate for the angle of the surface 134, leveling elements 136 are arranged in the cylindrical recesses 43 in the knobs 42. Depending upon the position of the knobs 42, the leveling elements 136 project to different extents out of the knobs 42. This can compensate for the angle of the surface 134.

Figure 12:
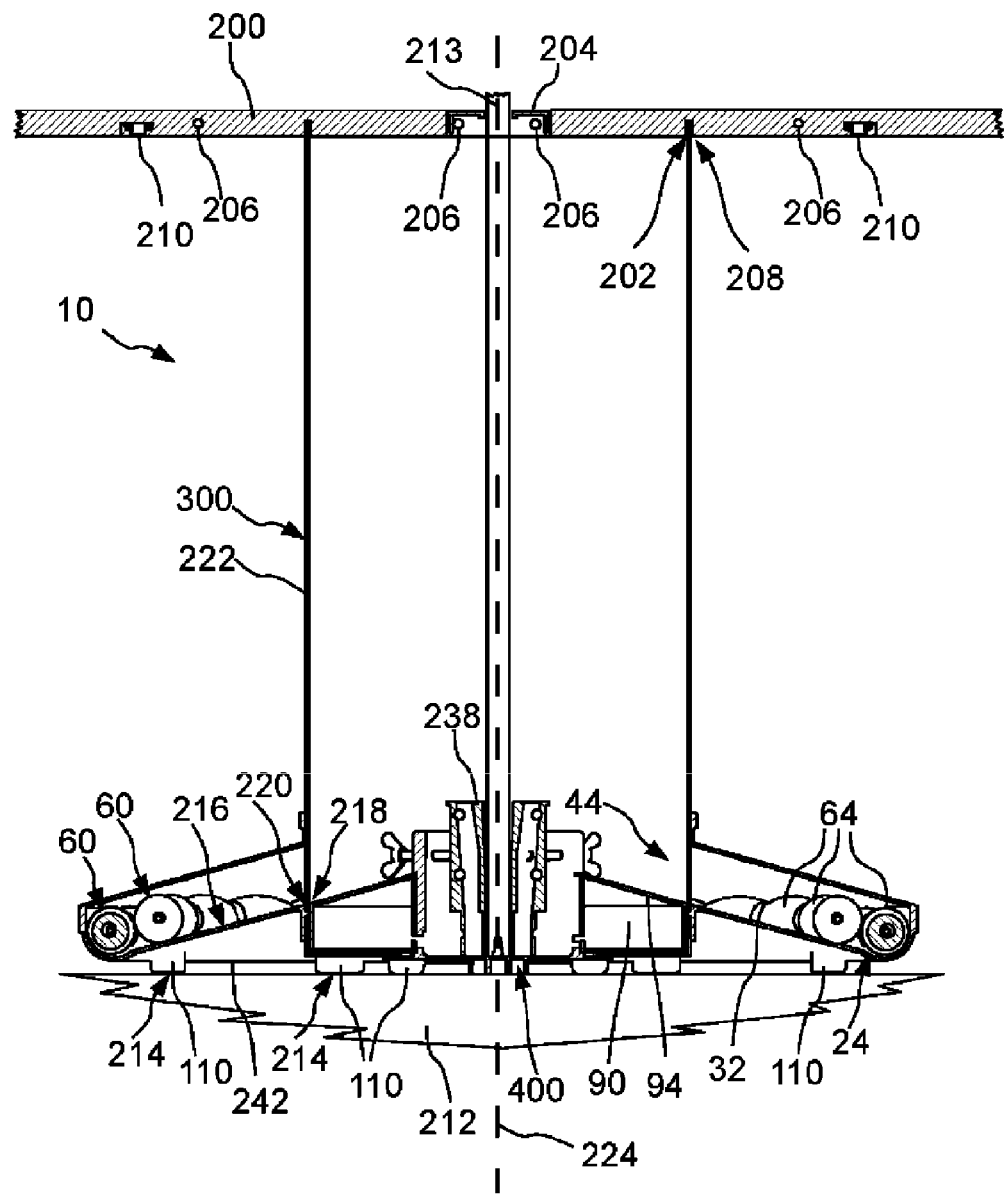
FIG. 12 shows a partial sectional view of an embodiment of a base with a hollow cylinder and a tabletop.

FIG. 12 shows a base 10 for holding at least one object 250 to be erected (in the present case, a table top 200 and a holding tube 213 for an umbrella 250), wherein the base 10 has a base surface 214 provided for arranging on a bearing surface 212 and a receiving surface 216 substantially opposite the base surface 214, wherein a receiving apparatus 220 having at least one groove 218 is arranged in the region of the receiving surface 216 for receiving a hollow cylinder 222. The drawing shows the base 10 in a partial sectional view.

In the present case, in a bottom region in FIG. 12, the base 10 comprises a table foot (no reference number) lying on a bearing surface 212, as well as a plate 300 (see FIG. 14) in the middle region of FIG. 12 that is curved relative to the hollow cylinder 222, as well as the table top 200 in a top region in FIG. 12. The table top 200 is only implied in FIG. 12; the table top 200 is depicted in greater detail in FIGS. 17A through 19C.

In other embodiments, the base 10 may comprise only the table foot lying on the bearing surface 212, or only the table foot together with the hollow cylinder 222.

In the present case, the base 10 is designed to be substantially rotationally symmetrical to a longitudinal axis 224

(that runs concentrically to the holding tube 213). In other embodiments of the base 10, the table foot, and/or the hollow cylinder 222, and/or the table top 200 are designed to be elliptical, rectangular, or square.

In the present case in the table foot, the base 10 comprises two ballast weights 60 that are received in the radially outer peripheral receiving position 24 of the base 10. The ballast weights 60 each comprise a plurality of ballast elements 64, designed approximately in the shape of a barrel, that are connected to each other by means of the connecting means 68 (not visible in the drawing). The connecting means 68 is, for example, a cord, a string, or a chain. The ballast weights 60 are held in a receiving position 24 by a transport surface 32, designed as a conical frustum, of the base 10.

The ballast weight 60 can be introduced into the infeed region 44 by means of an insertion device 90 (designed to be substantially rotationally symmetrical). This is done before the hollow cylinder 222 is installed in the groove 218. The insertion device 90 has an insertion surface 94 on which the ballast weight 60 can be placed. After being placed on the insertion surface 94, the ballast weight 60 moves under gravity across the transport surface 32 and thereby into the receiving position 24. Under gravity, the ballast weight 60 rolls, as it were, with its barrel-shaped ballast elements 64 over the insertion surface 94 and transport surface 32 into the receiving position 24.

Furthermore, the base 10 comprises a centrally arranged folding device 238 in which, in the present case, the holding tube 213 for an umbrella 250 (not shown) is arranged by means of wing screws (no reference number). For its part, the holding device 238 is held in an adapter apparatus 400 that is arranged centrally relative to the longitudinal axis 224 in the base 10; See also FIGS. 22A through 22D below.

At a bottom housing section 242 in FIG. 12, the base 10 has a plurality of bearing elements 110 ("knobs"), by means of which the base 10 lies on the bearing surface 212. Together, the bottom surfaces of the bearing elements 110 characterize the base surface 214 of the base 10.

In one embodiment, the groove 218—in particular, in a plane parallel to the base surface 214—is designed to be elliptical, at least sectionally. In FIG. 12, the groove 218 is designed to be circular, at least sectionally, in a plane parallel to the base surface 214. In the present case, the hollow cylinder 222 is, accordingly, a circular cylinder.

In an embodiment not shown, the groove 218—in particular, in a plane parallel to the base surface 214—is designed to be polygonal, at least sectionally.

In another embodiment not shown, the groove 218 is designed, at least sectionally, as a curve, e.g., a general curve—in particular, in a plane parallel to the base surface 214—and can accordingly also have, inter alia, a significantly more complex geometry than elliptical or polygonal grooves. For example, the groove has a parabolic shape or hyperbolic shape or the like, at least sectionally.

In FIG. 12, the groove 218 has a closed path—in particular, in a plane parallel to the base surface 214. Correspondingly, the groove 218 is designed to run radially around the longitudinal axis 224 of the base 10.

Generally speaking, such a radially peripheral groove 218 can also be understood as the interior of a cylinder formed by the receiving apparatus 220, wherein, in an extreme case, a radially interior "delimiting wall" of the groove 218 assumes a vanishingly small radius. This case obtains, for example, when the insertion device 90 is removed in FIG. 12. Particularly when the hollow cylinder 222 has a comparatively thick material, the hollow cylinder 222 can still be arranged in the receiving apparatus 220 with suitable stability.

In an embodiment not shown, the groove 218—in particular, in a plane parallel to the base surface 214—has an open path. For example, as in FIG. 12, the groove 218 is designed to run radially around the longitudinal axis 224 of the base 10, wherein the groove 218 is, however, interrupted once or several times—for example, to save material. For example, the groove can also have a "C" shape.

Of course, the groove 218 is always designed to be "open" at the top in a radial sectional plane (as in FIG. 12), to be able to accommodate the hollow cylinder 222.

In an embodiment not shown of the base 10, the receiving surface 216 is designed to be substantially flat, at least sectionally—in particular, substantially parallel to the base surface 214.

In another embodiment, the receiving surface 216 is designed to be angled, at least sectionally—in particular, in a radial direction with respect to the longitudinal axis 224 of the base 10.

In the embodiment in FIG. 12, the receiving surface 216 has the shape of a lateral surface of a conical frustum. An angle of the conical frustum relative to the base surface 214 has a value within a range of 10° to 80°, preferably within a range of 10° to 50°, and still more preferably within a range of 12° to 20°. In FIG. 12, the angle is approximately 16°.

As already described, the hollow cylinder 222 is received in the receiving apparatus 220. In particular, the hollow cylinder 222 is releasably received in the groove 218 of the receiving apparatus 220. Correspondingly, the hollow cylinder 222 has a circular cross section in a plane parallel to the base surface 214.

In other embodiments of the base 10, the hollow cylinder 222 has a cross-section designed to be elliptical, or circular, or polygonal, or curved, at least in sections, in a plane parallel to the base surface 214.

In another embodiment, the hollow cylinder 222 is designed substantially as a single piece. In the present case, the hollow cylinder 222 comprises a flexible and/or kinkable plate 300 (see FIG. 14), wherein the plate 300 is designed to be flexed and/or kinked into the shape of the hollow cylinder 222. It is particularly advantageous that the flexible and/or kinkable plate 300 can be easily transported. For example, when transporting, a plurality of plates 300 can be placed flat upon each other to yield a minimum volume.

In one embodiment, the hollow cylinder 222 is designed to be integrally bonded around the perimeter in a plane parallel to the base surface 214. For example, opposing edge sections of the plate 300 are bonded into a closed shape by means of welding or adhesion.

In an alternative embodiment, the hollow cylinder 222 has an overlap or a butt joint with itself in a plane parallel to the base surface 214. Preferably, means are available for connecting two edge sections to each other of the hollow cylinder 222 to the overlap or butt joint.

As can also be seen in FIG. 12, the base 10 comprises the hollow cylinder 222 that is received in the receiving apparatus 220—in particular, in the groove 218 of the receiving apparatus 220. In the present case, the base 10 can comprises a table top 200 that is arranged on an end section of the hollow cylinder 222 facing away from the base 10. The hollow cylinder 222 can be connected to the table top 200 in a way similar (but not necessarily equivalent) to how the hollow cylinder 222 is received in the table foot (at the bottom in FIG. 12) of the base 10.

As can be seen further below, the table top 200 has a radially peripheral groove 202 in the present case, to accommodate the end section of the hollow cylinder 222. Furthermore, the table top 200, or an annular element 204 arranged centrally in the table top 200, comprises a substantially central opening (no reference number) that is designed to surround and/or radially hold the outside of a holding tube 213—in particular, the holding tube 213 for an umbrella stand.

Furthermore, holes 206 in the table top 200 are shown in FIG. 12 that make it possible to connect two, at least approximately half, partial tabletops 200a and 200b (see FIGS. 17A through 19C) to each other. For this purpose, locking means 210 are additionally on the table top 200.

Figure 13:
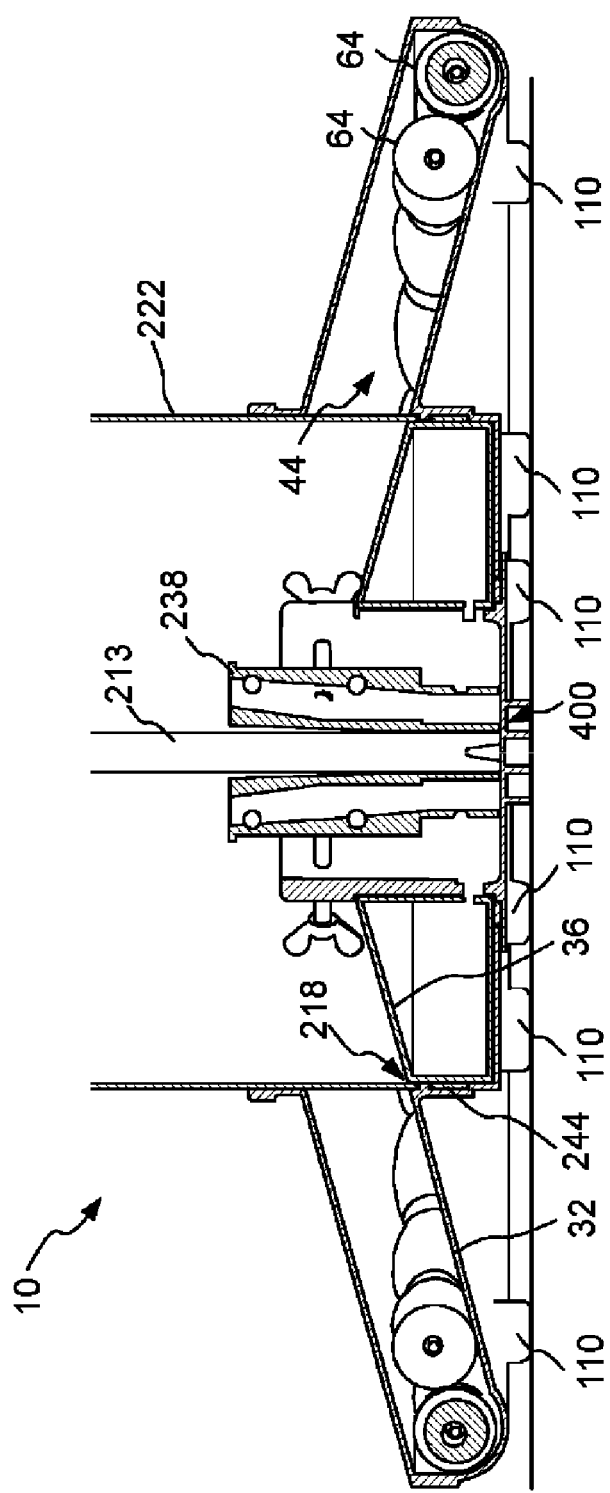
FIG. 13 shows an enlarged representation of a bottom region of the base in FIG. 12.

FIG. 13 shows the first section of the base 10 from FIG. 12 in an enlarged view. At an end section facing the base 10, the hollow cylinder 222 has at least one part of a bayonet lock 244 that is designed to connect the hollow cylinder 222 to the stand 10. Said end section is substantially enclosed by the groove 218.

Figure 14:
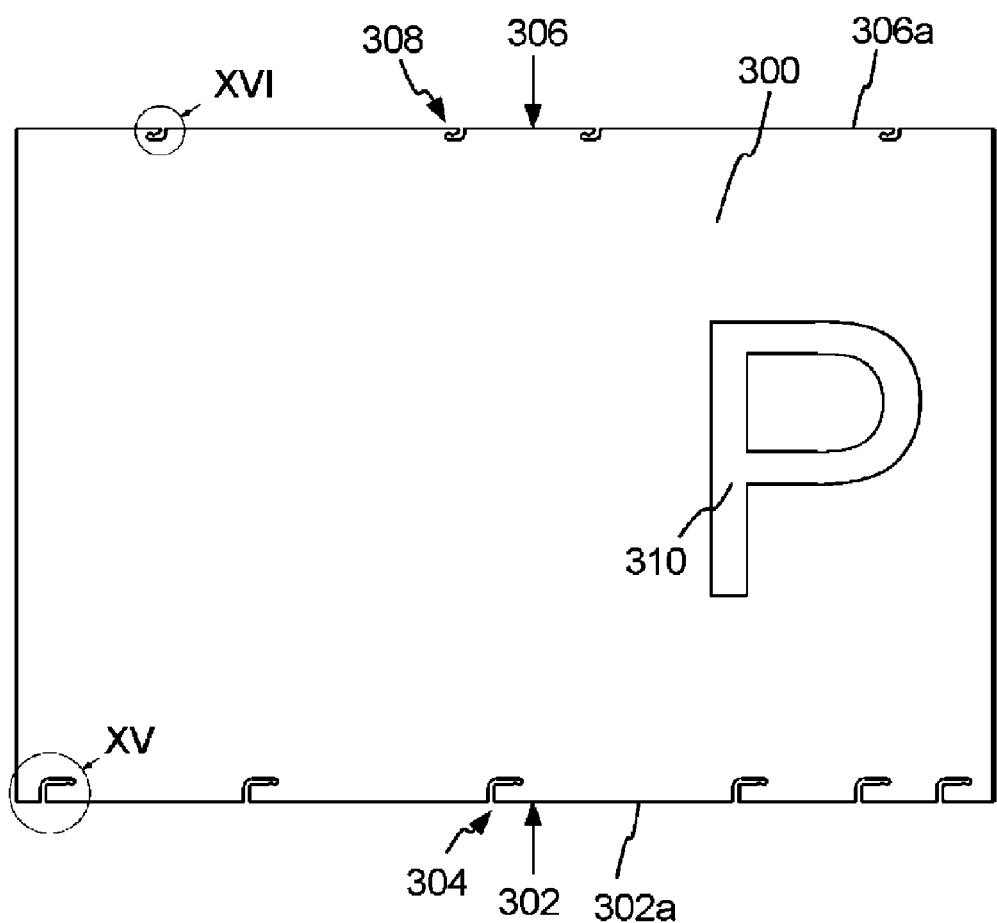
FIG. 14 shows a plate by means of which the hollow cylinder from FIG. 12 can be formed.

In a first version thereof, the at least one part of the bayonet lock 244 is formed by at least one cutout 304 in the hollow cylinder 222 (see FIG. 14). In a second version, the at least one part of the bayonet lock 244 is formed by at least one pin-like stamping in the hollow cylinder 222. In this context, the receiving apparatus 220 comprises a corresponding complementary part of the bayonet lock 244.

In a similar manner, the table top 200 and hollow cylinder 222 can also be connected to each other by means of at least one bayonet lock 208 (FIG. 12). For this purpose, the end section of the hollow cylinder 222 has at least one cutout 308 (preferably a plurality of cutouts 308) for a first part of the bayonet lock 208, wherein the table top 200 has at least one bolt 240 for a second part of the bayonet lock 208. See below—in particular, FIGS. 14, 19B, and 19C.

Figure 15:
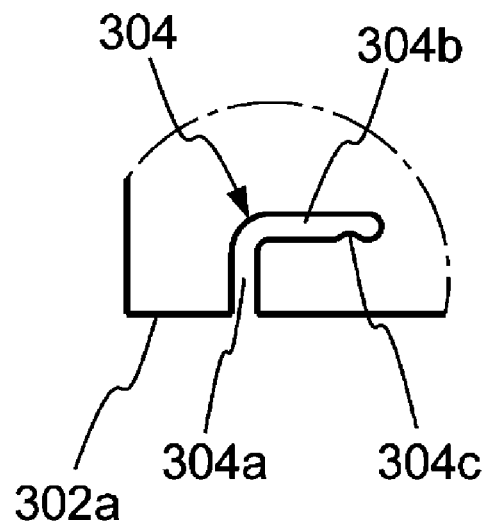
FIG. 15 shows a section XV from FIG. 14 with a first cut-out in the plate.
Figure 16:
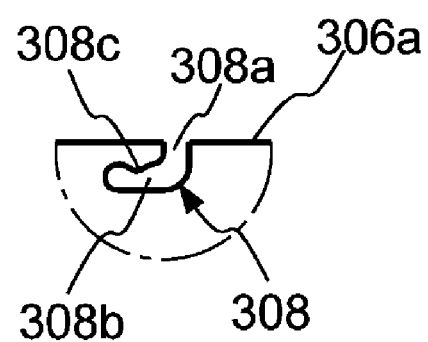
FIG. 16 shows a section XVI from FIG. 14 with a second cut-out in the plate.

Together with FIGS. 15 and 16, FIG. 14 shows a plate 300 that is flexible and/or kinkable, and that is substantially designed in the shape of a polygon—preferably, a rectangle. As can be seen, the plate 300 in the present case has, in a first side 302 (at the bottom in FIG. 14), six cutouts 304 open to the first side 302, wherein, proceeding from an edge 302a of the first side 302, the cutout 304 comprises a first section 304a that extends at least approximately at a right angle to the edge 302a, and wherein, proceeding from the first section 304a, the cutout 304 comprises a second section 304b, which then extends at least approximately parallel to the edge 302a; see also FIG. 15.

For example, the first section 304a has an angle of approximately 70° to 110°, and preferably, approximately 80° to approximately 100°, relative to the edge 302a. In the present case, this angle is approximately 90°. For example, the second section 304b has an angle of approximately +10° to approximately −10°, and preferably, approximately +4° to approximately −4°, relative to the edge 302a. In the present case, this angle is approximately 0°. In this context, the first and second section 304a and 304b each have, at least approximately, a constant width (no reference number).

Moreover, it can be seen in FIG. 15 that the cutout 304 has an at least approximate L-shape, wherein the first and second section 304a and 304b each correspond to a leg of the L-shape. In addition, the second section 304b has a local narrowing 304c of the width. Proceeding from the first section 304a, the local narrowing 304c of the width of the second section 304b is more distant from the first section 304a than approximately 60% of a length of the second section 304b. The cutout 304 is designed as a part of the bayonet lock 244.

Furthermore, it can be seen in FIG. 14 that the plate 300, in at least a second side 306 (at the top in FIG. 14), has at least one cutout 308 open toward the second side 306, wherein the second side 306 preferably lies opposite the first side 302. In the present case, the four cutouts 308 in the second side 306 have a shape that is at least approximately comparable to that of the at least one cutout 304 of the first side 302. The cutouts 308 correspondingly each have a first section 308a, a second section 308b, and a local narrowing 308c (see FIG. 16). As can further be seen in FIG. 14, a width of the first and/or second section 308a and 308b of the second cutout 308, respectively, is less than a comparable width of the first cutout 304.

Preferably, the respective legs of the cutouts 304 and 308 of the first and second side 302 and 306, which legs are arranged facing away from the respective legs 302a and 306a, extend in opposite directions from each other. The advantage is that, after installing the hollow cylinder 222 on the first section of the base 10, the table top 200 can also be installed on the hollow cylinder 222, wherein, when engaging the respective bayonet locks 244 and 208, a rotational direction in the same direction is, in particular, achievable.

Preferably, two or more cutouts 304 and 308 are arranged in the first and second sides 302 and 306 of the plate 300, wherein, along the edge 302a and 306a, at least one distance between two cutouts 304 each on one side 302 is different from a distance between two comparable cutouts 308 each on the other side 306. The advantage is that, if the sides 302 and 306 are accidentally switched while installing the hollow cylinder 222 on the first section of the base 10 or table top 200, the smaller cutouts 308, in particular, in the present case cannot be damaged.

Preferably, a thickness of the plate 300 is less than or equal to 10 mm, preferably less than or equal to 5 mm, and still more preferably less than or equal to 2 mm. For example, the plate 300 comprises a metal, and/or a plastic material, and/or a cardboard material. In one embodiment, an outer lateral surface of the hollow cylinder 222 has stamped, printed, glued, and/or painted textual and/or pictorial information 310. This is for, an example, depicted by a large letter "P."

In one embodiment of the plate 300, a length of the edge 302a or 306a of the first or second side 302 or 306 is between approximately 30 cm and approximately 320 cm, preferably between approximately 60 cm and approximately 160 cm. Preferably, a diameter of the hollow cylinder 222 or a dimension comparable thereto is at least 20%, and preferably at least 40%, of a diameter of the base 10 (or said table foot), or a dimension comparable thereto.

In another embodiment (not shown), the plate 300 has a plurality of elements that are in a continuous series and connected to each other in a plane of the plate 300. For example, the elements are designed as lamella, similar to the case with blinds. Preferably, the connection of the elements is designed to be flexible, rotatable, and/or articulated. In a first version, the elements have specific bending ("flexible") points, e.g., by local reductions in the thickness of the plate 300. This is also known as a so-called "film hinge." In a second version, the elements have rod-shaped "shafts" on a first longitudinal side, and correspondingly have annular ("rotatable") "bushings" on a second longitudinal side. In a third version, two elements in each case grip, hook-like ("articulated"), in each other, as is known from blinds. In this manner, the plate 300 is provided with a "flexible" and/or "kinkable" property, even when the elements per se are designed to be rigid, and can be shaped corresponding to the hollow cylinder 222.

Figure 17A:
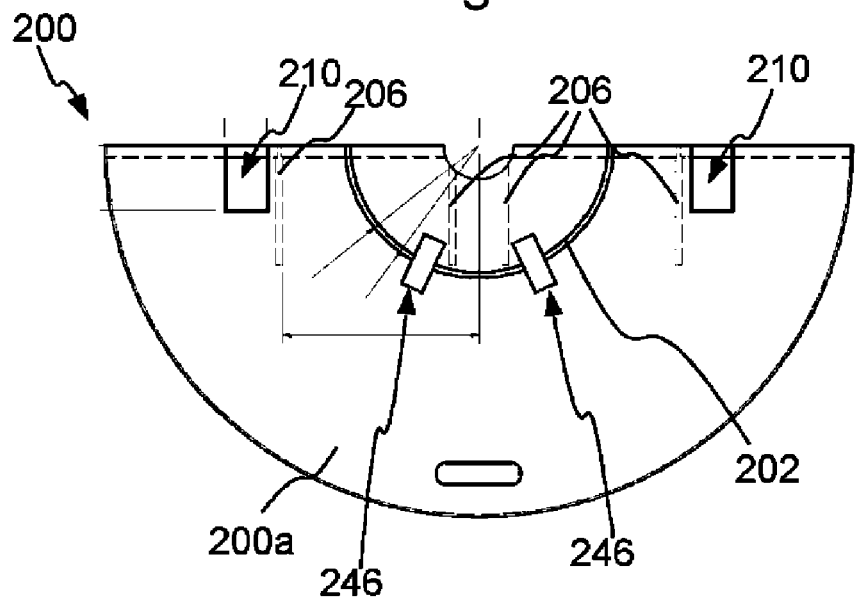
FIG. 17A shows a first view of a partial table top with a groove.
Figure 17B:
FIG. 17B shows a second view of the partial table top with a groove.
Figure 17C:
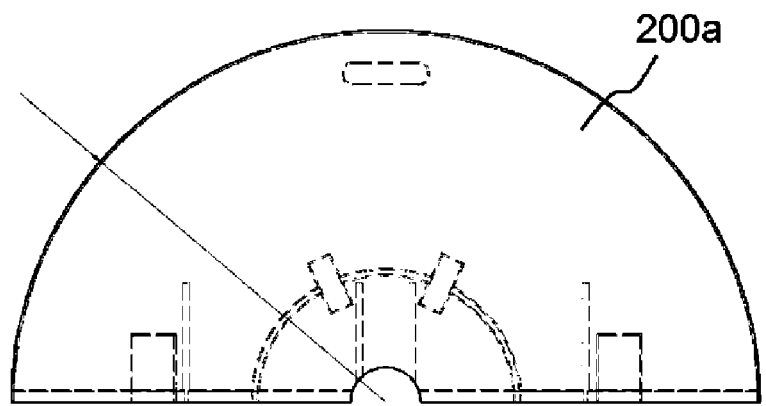
FIG. 17C shows a third view of the partial table top with a groove.
Figure 18A:
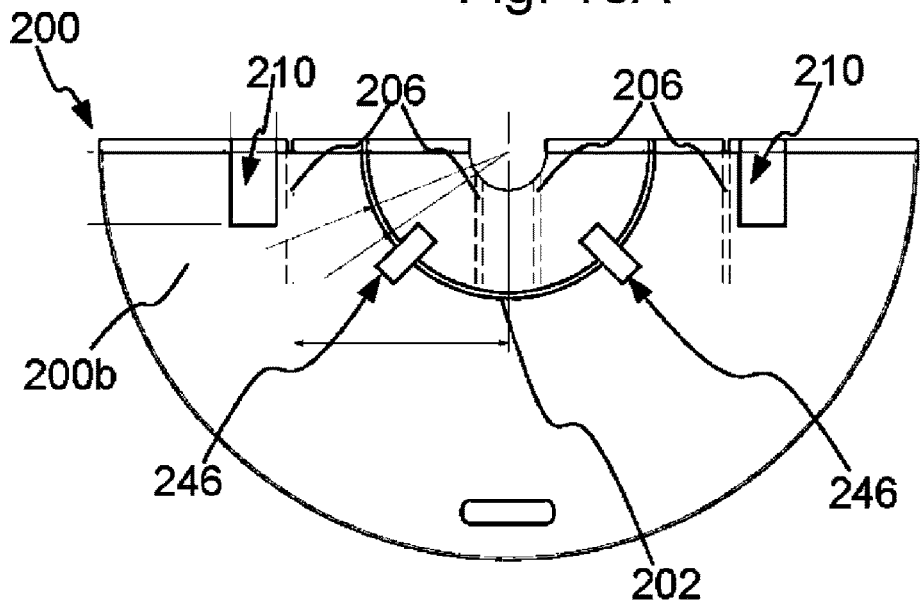
FIG. 18A shows a first view of a partial table top with a spring.
Figure 18B:
FIG. 18B shows a second view of the partial table top with a spring.
Figure 18C:
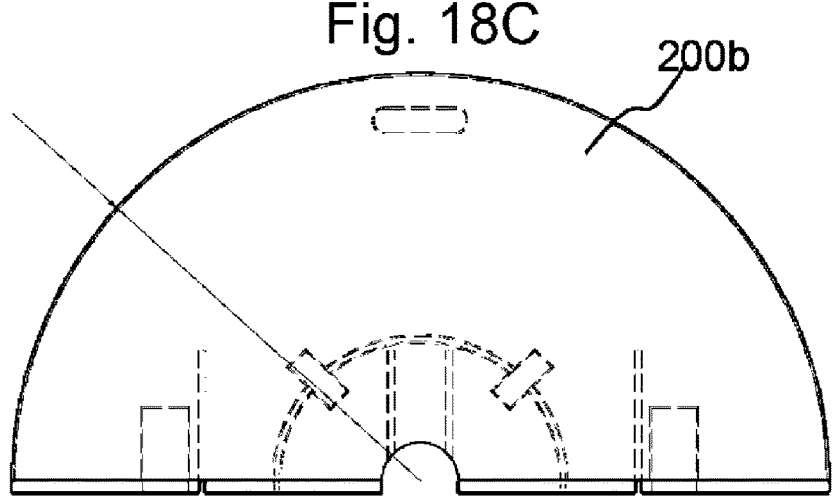
FIG. 18C shows a third view of the partial table top with a spring.

FIGS. 17A through 17C, 18A through 18C, and 19A through 19C show an embodiment of the table top 200, wherein the table top 200 comprises two partial table tops 200a and 200b that are designed to be substantially semicircular. At one connecting section (no reference number) of the two partial table tops 200a and 200b, one partial table top 200a has a groove (FIGS. 17A through 17C), and the other partial table top 200b has a spring (FIGS. 18A through 18C).

FIGS. 17A and 18A each show a view of partial table tops 200a and 200b from below, i.e., viewed from the bearing surface 212. FIGS. 17B and 18B each show a view of 17A or respectively 18A swung 90°. FIGS. 17C and 18C each show a view of FIG. 17B or respectively 18B swung 90° and thus a plan view of the partial table tops 200a and 200b. The elements shown in FIGS. 17C and 18C with a dashed line can be identified using the reference numbers from FIGS. 17A and 18A. Furthermore, cut out regions are in partial table tops 200a and 200b in FIGS. 17A and 18A, in which bolt retaining devices 246 (each as a part of the bayonet lock 208 for arranging on the hollow cylinder 222) can be arranged.

Preferably, means are available for connecting the two partial table tops 200a and 200b to each other. The means in the present case comprise rod-shaped elements that can be arranged in holes 206 in the partial table tops 200a and 200b that extend in a plane of the table top 200. This provides the table top 200 with sufficient mechanical stability. In addition, latching means 210 (or snap connectors) are available (see FIG. 12) for specifically connecting the partial table tops 200a and 200b.

Of course, the table top 200 or a combination of the two partial table tops 200a and 200b can have any desired geometry. For example, this geometry can be rectangular, circular, elliptical, or oval.

Figure 19A:
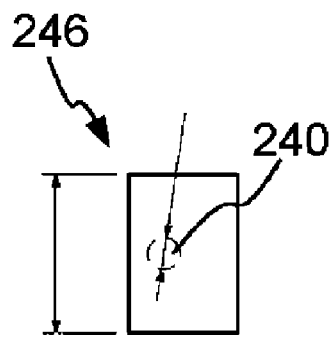
FIG. 19A shows a first view of a bolt holding device.
Figure 19B:
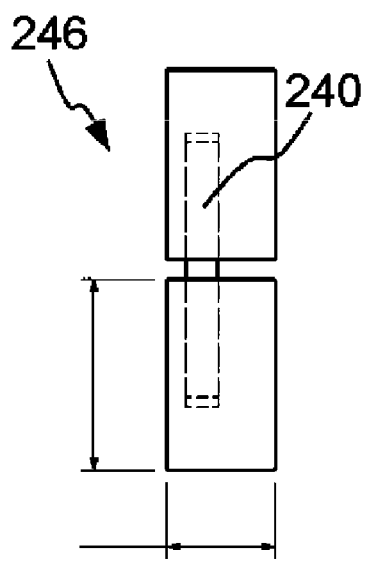
FIG. 19B shows a second view of the bolt holding device.
Figure 19C:
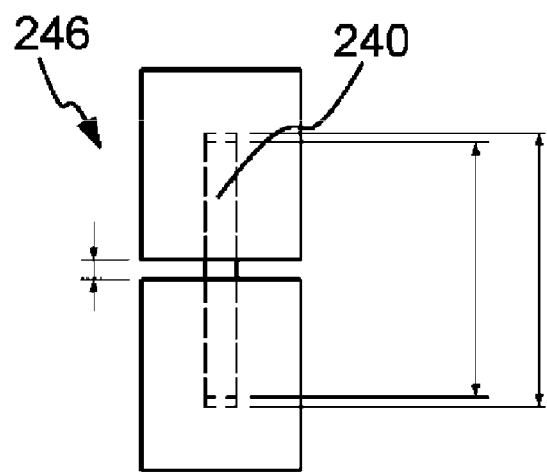
FIG. 19C shows a third view of the bolt holding device.

FIGS. 19A through 19C each show views of the bolt retaining device 246 swung 90°.

FIG. 20 shows a simplified, partial sectional view of a base 10 for holding at least one object 250 to be erected, wherein the base 10 comprises at least one primary sliding element or support element 252 that has an elastically deformable first partial body 252a, and at least one second partial body 252b comprising a ceramic material that is arranged in the first partial body 252a. Four primary support elements 252 are visible in FIG. 20.

In the following, the object 250 to be erected is, for example, characterized by an umbrella 250, which is why the umbrella 250 is also identified with reference number 250. FIG. 20 accordingly also shows an umbrella stand.

The base 10 lies on the bearing surface 212, which is only outlined. The bearing surface 212 is, for example, a floor, a wall-to-wall carpet, a surface covered with tiles, rocks, or an asphalt pavement, or ground. In this context, the second partial body 252b lies on the support surface 212. At least part of the volume of the first partial body 252a is in the base 10 and thus arranged above the second partial body 252b in the drawing.

In the present case, the umbrella 250 comprises the holding tube 213 that is held in the base 10 by means of a holding device 238 (not visible in FIG. 20) (see FIGS. 12 and 13). For example, the holding tube 213 is designed as a modular unit with the umbrella 250. In other embodiments not shown, the object 250 to be erected is a Christmas tree, a table, or a chair, such as an office chair.

In another embodiment of the base 10, the second partial body 252b comprises a metal, plastic, wood, hard rubber, cement, or glass. Due to the cited materials, corresponding differences with regard to frictional properties, elasticity, and/or fatigue strength may result from case to case.

In one embodiment of the base 10, the second partial body 252b is connected to the first partial body 252a by a form fit, and/or force fit, and/or integral bond. For example, the second partial body 252b is connected to the first partial body 252a by means of adhesion.

In one embodiment of the base 10, the second partial body 252b is produced by vapor deposition—in particular, vapor deposition of a ceramic material—on the first partial body 252a.

In one embodiment, the first partial body 252a comprises a rubber, and/or a foam, and/or a plastic, and/or a spring that can respond to pressure.

For example, the first partial body 252a has a modulus of elasticity less than 10 kN/mm$^2$, preferably less than 5 kN/mm$^2$, and more preferably less than 1 kN/mm$^2$. Likewise, a Shore A hardness of the first partial body 252a can be less than 50, preferably less than 20, and more preferably less than 10.

As can be seen in FIG. 20, the vertical dimension in the drawing, and thus a volume of the first partial body 252a, is greater than a corresponding dimension and volume of the second partial body 252b. Depending upon a respective embodiment of the base 10, a ratio of the volume of the first partial body 252a to the volume of the second partial body 252b preferably has a value greater than or equal to 1, preferably a value greater than or equal to 20, and more preferably greater than or equal to 500. The second partial body 252b can, accordingly, be designed to be comparatively thin—which, however, is not absolutely necessary.

In one embodiment, the second partial body 252b has a modulus of elasticity greater than 0.3 kN/mm$^2$, preferably greater than 10 kN/mm$^2$, and more preferably greater than 25 kN/mm$^2$. For example, a specific "ceramic" can have a modulus of elasticity of approximately 0.3 to approximately 30 kN/mm$^2$, depending upon the type. Likewise, a Shore D hardness of the second partial body 252b can be greater than 80, preferably greater than 100, and more preferably greater than 150.

In one embodiment not shown, the primary support element 252 is held in the base 10 by means of screws—in particular, by screwing the primary support element 252 into the base 10. For example, the primary support element 252 thereof comprises a threaded section (not shown). Alternatively, the primary support element 252 can be held in the base 10 by being snapped in.

Furthermore, the base 10 comprises a secondary sliding element or support element 254, wherein, particularly in an unloaded state, the primary support element 252 extends further out of a base plane of the base 10 than the secondary support element 254. This is shown in the following FIG. 21. In the embodiment in FIG. 20, the secondary support element 254 is a bottom housing section or floor of the base 10, wherein the base 10 is designed to be substantially flat on its bottom side facing the bearing surface 212.

Depending upon an embodiment, the secondary support element 254 has a modulus of elasticity greater than or equal to 0.1 kN/mm$^2$, and preferably greater than or equal to 5 kN/mm$^2$.

Preferably, the base 10 is designed such that a surface (facing the bearing surface 212) of the second partial body 252b of the primary support element 252 has a first friction coefficient relative to a reference surface (that corresponds, for example, to the bearing surface 212), wherein a surface of the secondary support element 254 has a second friction coefficient relative to the same reference surface that is greater than the first friction coefficient.

In one embodiment, the primary support element 252 comprises a compound material, wherein at least one first component of the compound material comprises a rubber elastic material. In particular, the elastic property of rubber is exploited.

In one embodiment not shown of the base 10, at least one additional support element is provided that comprises at least one roller, cylinder, or rollable sphere. Preferably, the primary support element 252 is arranged on a main body of the base 10 by means of a spring that responds to pressure—preferably, a helical spring or leaf spring.

For example, said additional support element can be provided in addition to the primary and secondary support element 254 and 254, or the primary support element 252 can be replaced by the other support element. In the latter case, the base 10 can, for example, have rollers that press against the bearing surface 212 by means of springs (in the absence of the first partial body 252a having an elastic material), wherein a function similar to the embodiment in FIG. 20 results.

Figure 21:
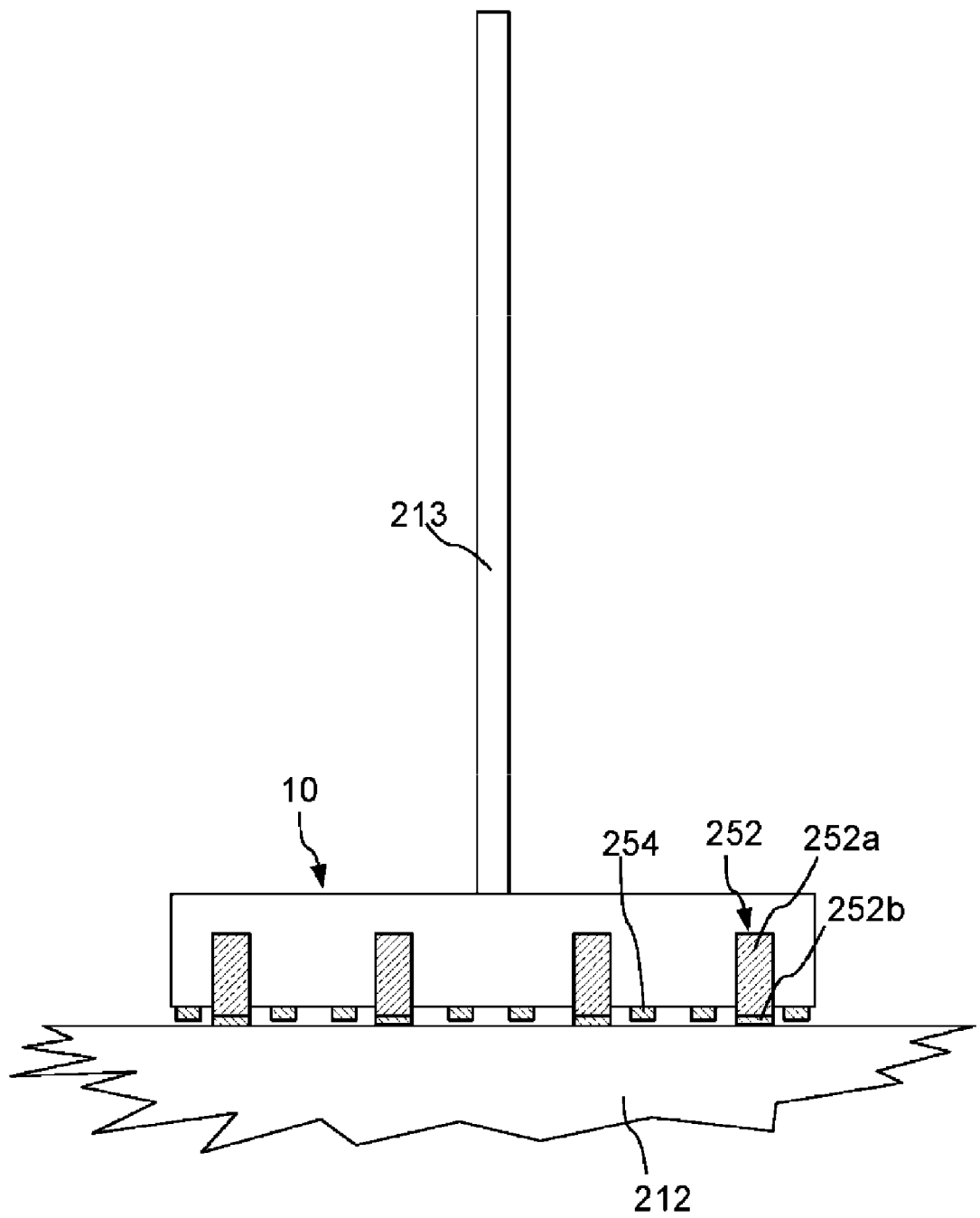
FIG. 21 shows the base from FIG. 20 in a second state.

Preferably, an elasticity constant or spring constant for the primary support element 252 (or for the first support body 252a) exists, such that, when the base 10 is subjected to an initial weight, the at least one primary support element 252 can press against the bearing surface 212 in addition to the at least one secondary support element 254 (FIG. 20), and, when the base 10 is subjected to a second weight that is less than the first weight, the at least one secondary support element 254 can lift off of the bearing surface 212 (FIG. 21).

The first weight, for example, according to FIG. 20 results from an intrinsic weight of the base 10 plus one or more ballast weights 60 optionally arrangeable in the base 10 (see, for example, FIG. 8, 12, or 13), plus a weight of the umbrella 250.

The second weight corresponds, for example, to an umbrella 250 that is partially removed from the base 10, and/or a ballast weight 60 that is at least partially removed from the base 10. This is shown in FIG. 21. To the extent that the holding tube 213 is designed as a modular unit with the umbrella 250, both elements 250 and 213 are removed together.

Corresponding to the weight reduced in this manner, the secondary support element 254 can thus lift off of the bearing surface 212. The base 10 thereby rests upon the bearing surface 212 with only the primary support elements 252. Because the second partial bodies 252b have comparatively low friction against the bearing surface 212 as described above, the base 10 can be moved with comparatively little force on the bearing surface 212 in the state in FIG. 21, and thus be transported without the base 10 having to be additionally lifted.

In one embodiment not shown, the object 250 to be erected is a chair, such as an office chair, that is, accordingly, arranged on a base 10.

In another embodiment not shown, the object 250 to be erected is a table, such as a single-leg table, that is, accordingly, arranged on a base 10.

For the sake of comprehension, dimensions (in millimeters) are provided in several of the figures described below. However, it is expressly noted that all of the dimensions are only examples. The invention can also be designed with dimensions that strongly deviate therefrom, and/or with proportions that strongly deviate therefrom, and/or with details that strongly deviate therefrom.

Figure 22A:
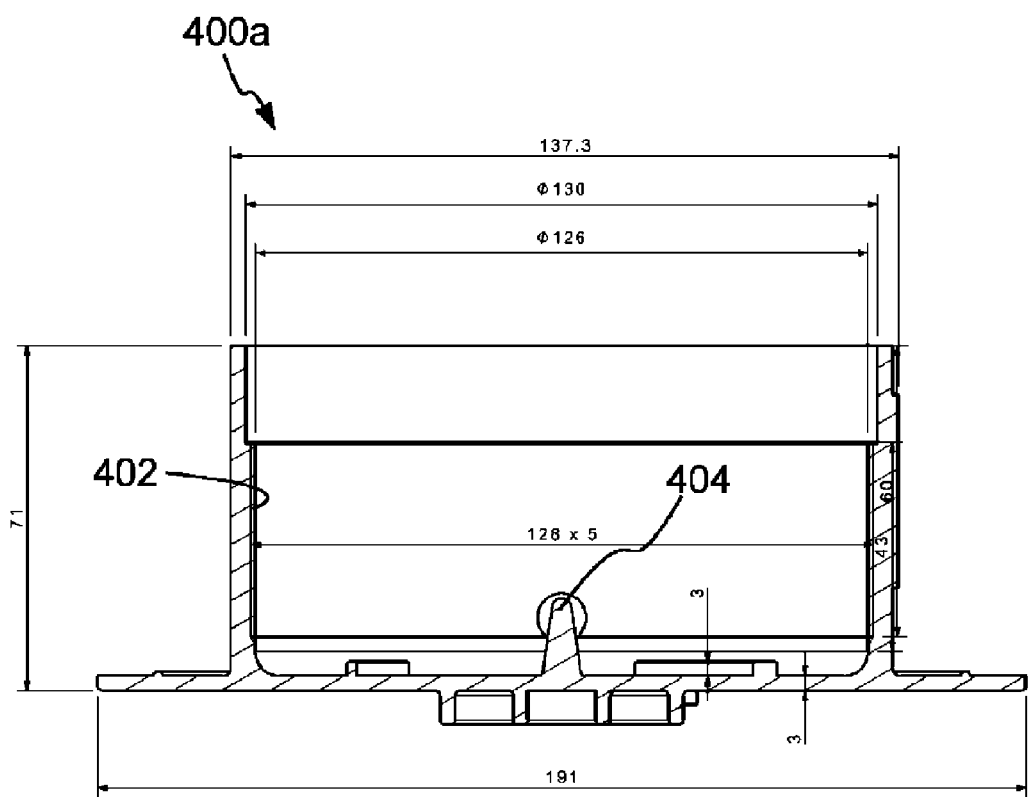
FIG. 22A shows a first view of a bottom threaded sleeve of a first adapter apparatus for holding the object to be erected.

FIG. 22A shows a sectional view corresponding to a line A-A from FIG. 22C of a bottom threaded sleeve 400a of the first adapter apparatus 400, designed to be substantially rotationally symmetrical, for holding the object 250 to be erected; see also FIGS. 12 and 13. The bottom threaded sleeve 400a comprises an inner thread 402, as well as a centering pin 404.

Figure 22B:
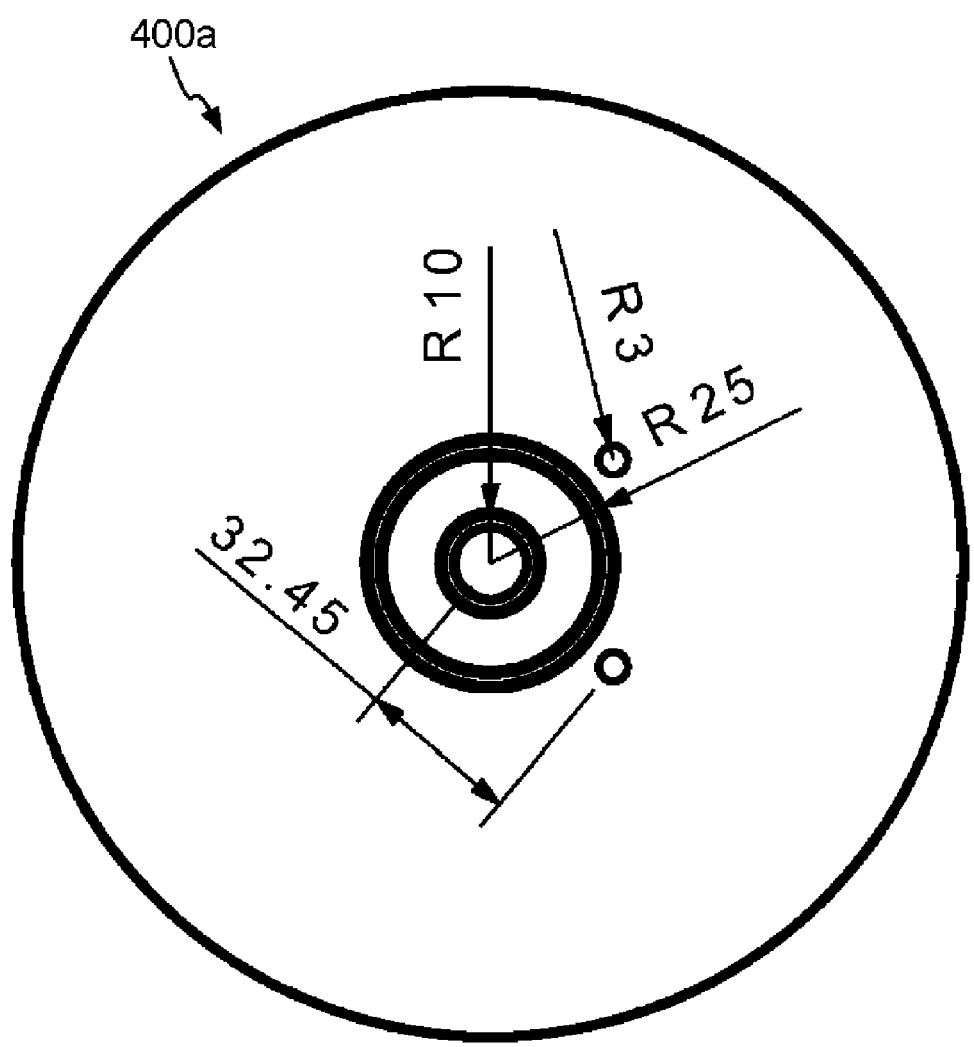
FIG. 22B shows a second view of the bottom threaded sleeve from FIG. 22A.
Figure 22D:
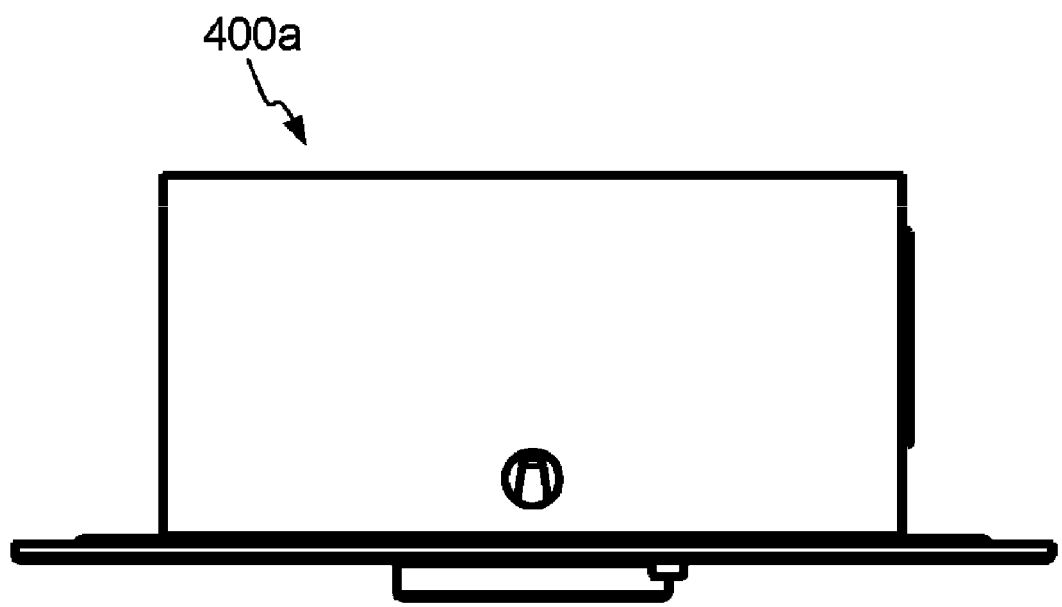
FIG. 22D shows a fourth view of the bottom threaded sleeve from FIG. 22A.

FIGS. 22B and 22C show a view of a bottom threaded sleeve 400a from below and respectively from above (with reference to FIGS. 12, 13, and 22A). FIG. 22D shows a "bottom view" of the bottom threaded sleeve 400a.

Figure 23A:
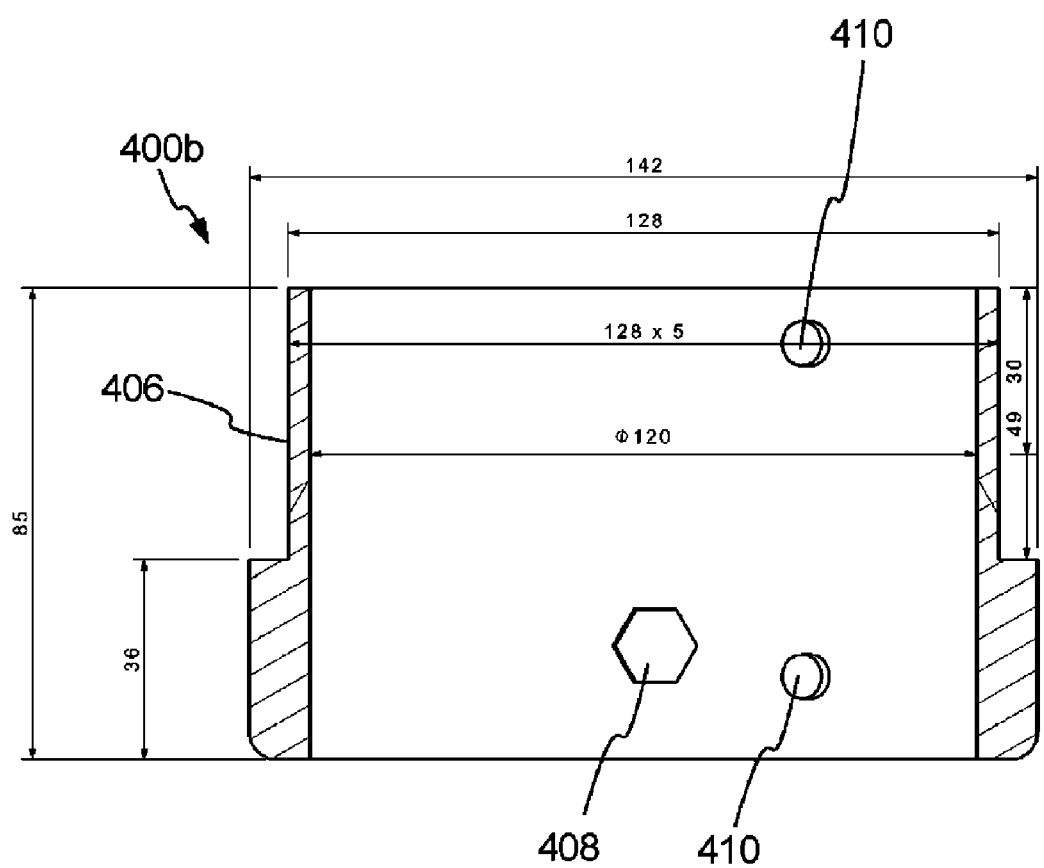
FIG. 23A shows an axial sectional view of a top threaded sleeve of the first adapter apparatus.

FIG. 23A shows a sectional view corresponding to a line A-A from FIG. 23B of a top threaded sleeve 400b of the first adapter apparatus 400, which is designed to be substantially rotationally symmetrical. The top threaded sleeve 400b has an outer thread 406. Furthermore, a hexagonal opening 408, as well as two circular knobs 410, can be seen in FIG. 23A.

Figure 23C:
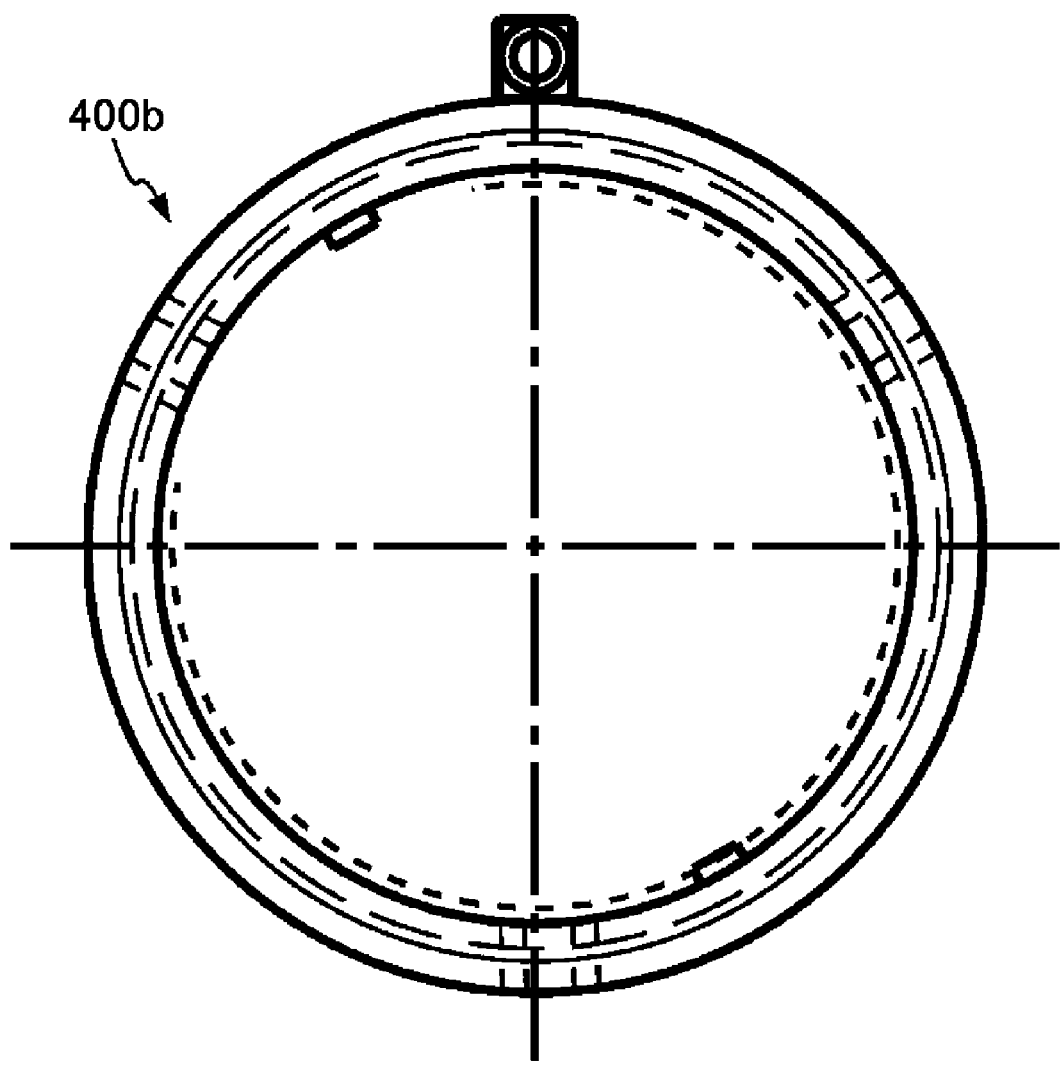
FIG. 23C shows a second radial view of the top threaded sleeve from FIG. 23A.
Figure 23D:
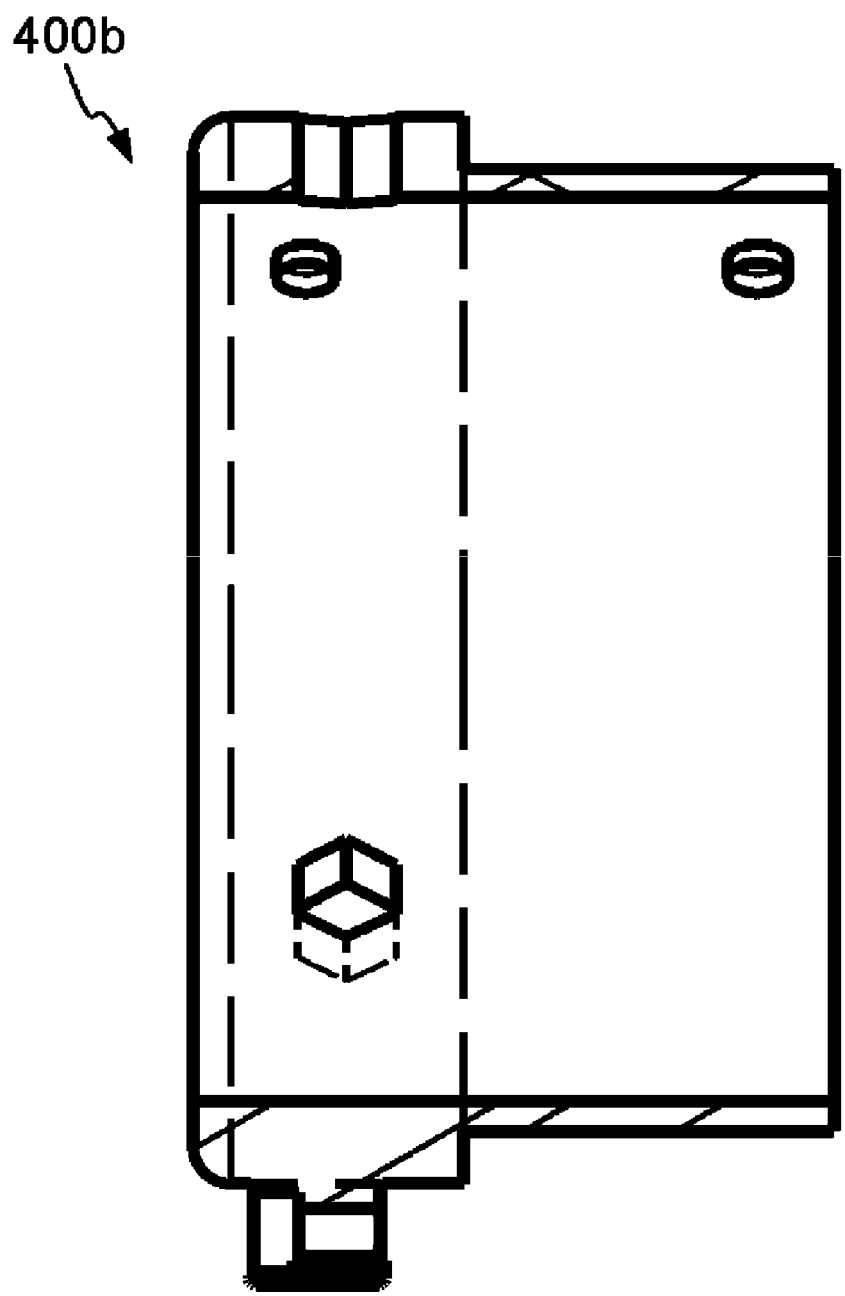
FIG. 23D shows an axial sectional view corresponding to a line B-B from FIG. 23B.
Figure 23E:
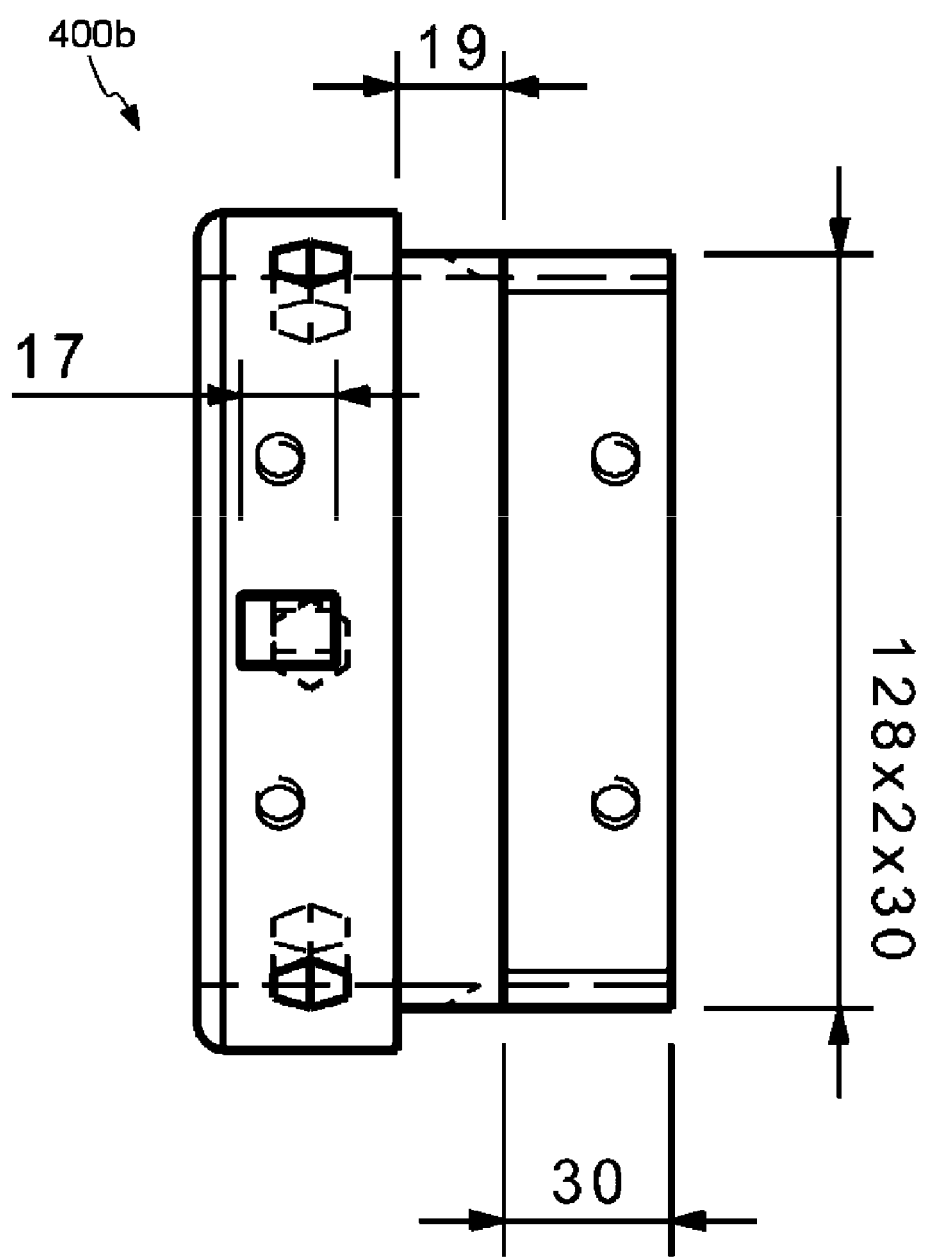
FIG. 23E shows another view of the top threaded sleeve from FIG. 23A.

FIGS. 23B and 23C show a first and a second radial view of the top threaded sleeve 400b. FIG. 23D shows a sectional view of the top threaded sleeve 400b corresponding to a line B-B from FIG. 23B. FIG. 23E shows an axial view of the top threaded sleeve 400b.

Figure 24A:
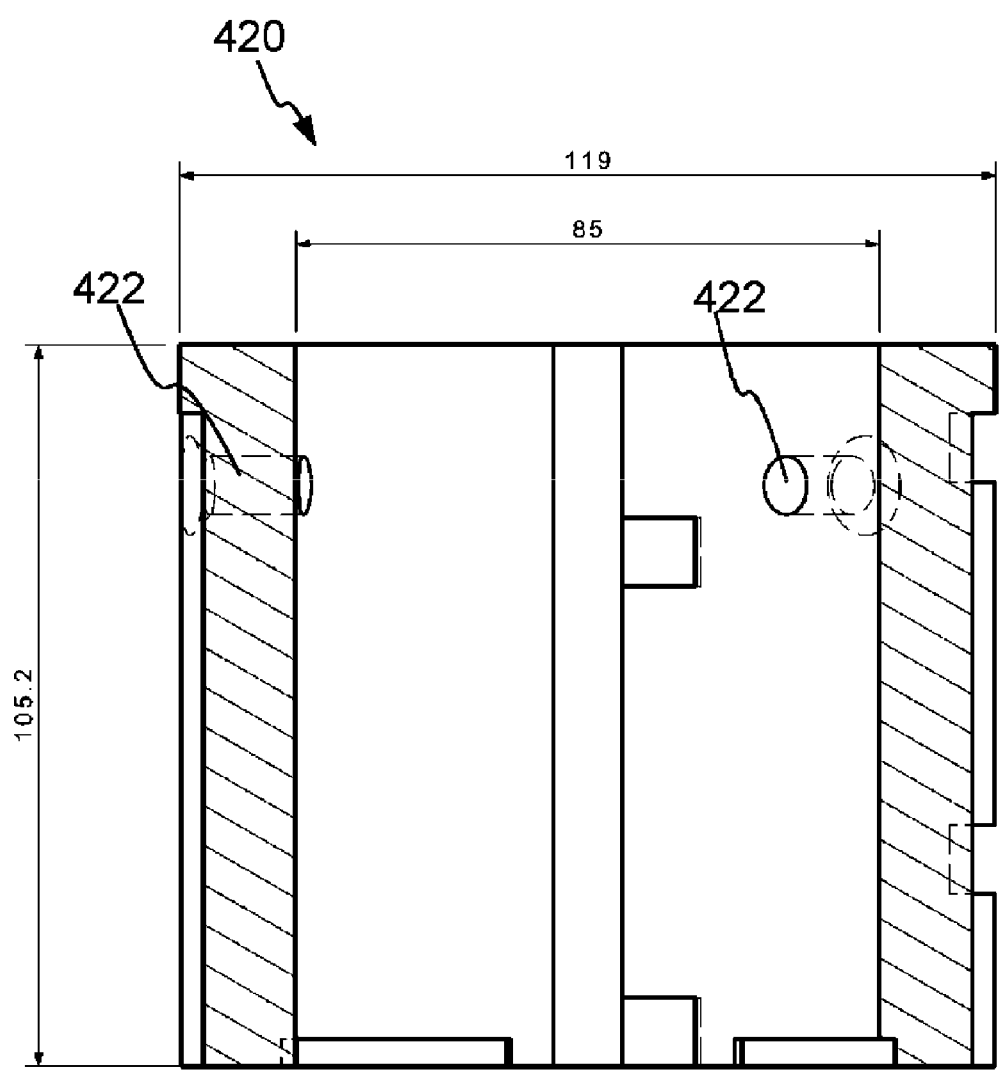
FIG. 24A shows a sectional view corresponding to a line A-A from FIG. 24B of a second adapter apparatus for holding the object to be erected.

FIG. 24A shows a sectional view corresponding to a line A-A from FIG. 24B of a second adapter apparatus 420 for holding the object 250 to be erected. In the present case, two holes 422 are visible in FIG. 24A. Preferably, a radial outer dimension of the second adapter apparatus 420 is less than or equal to a radial inner dimension of the first adapter apparatus 400 or the top threaded sleeve 400b.

Figure 24C:
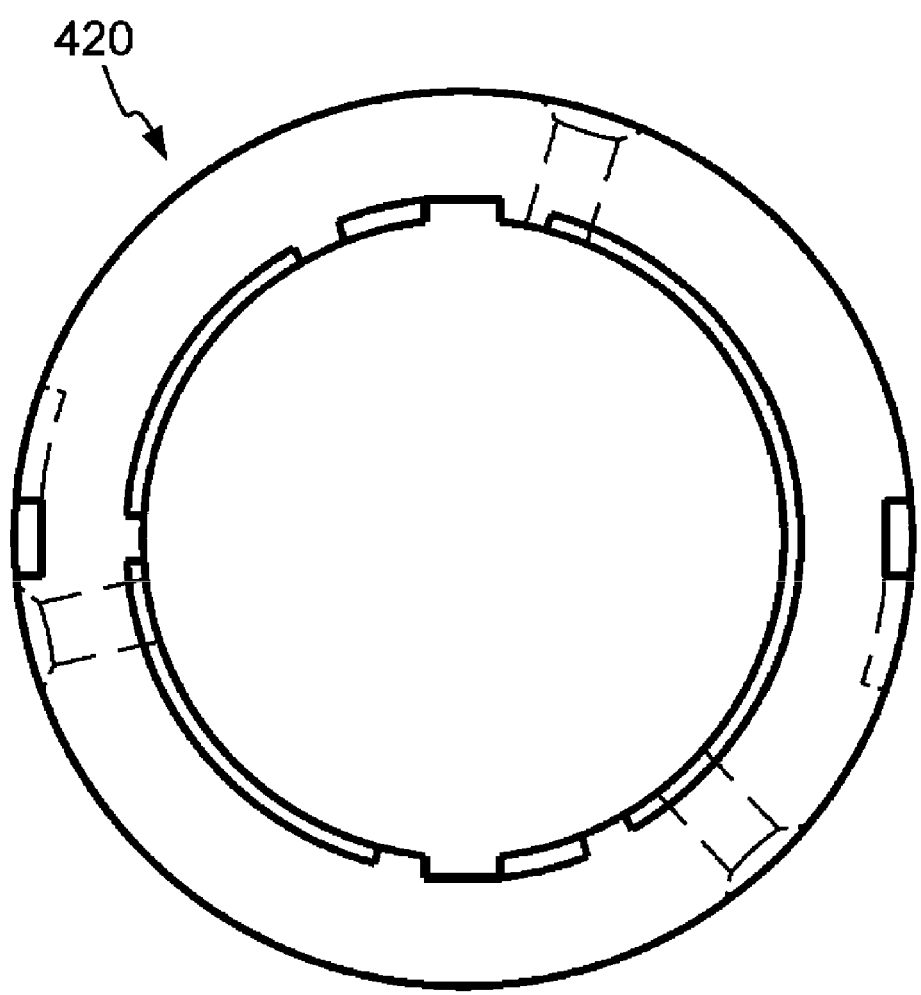
FIG. 24C shows a second radial view of the second adapter apparatus.
Figure 24D:
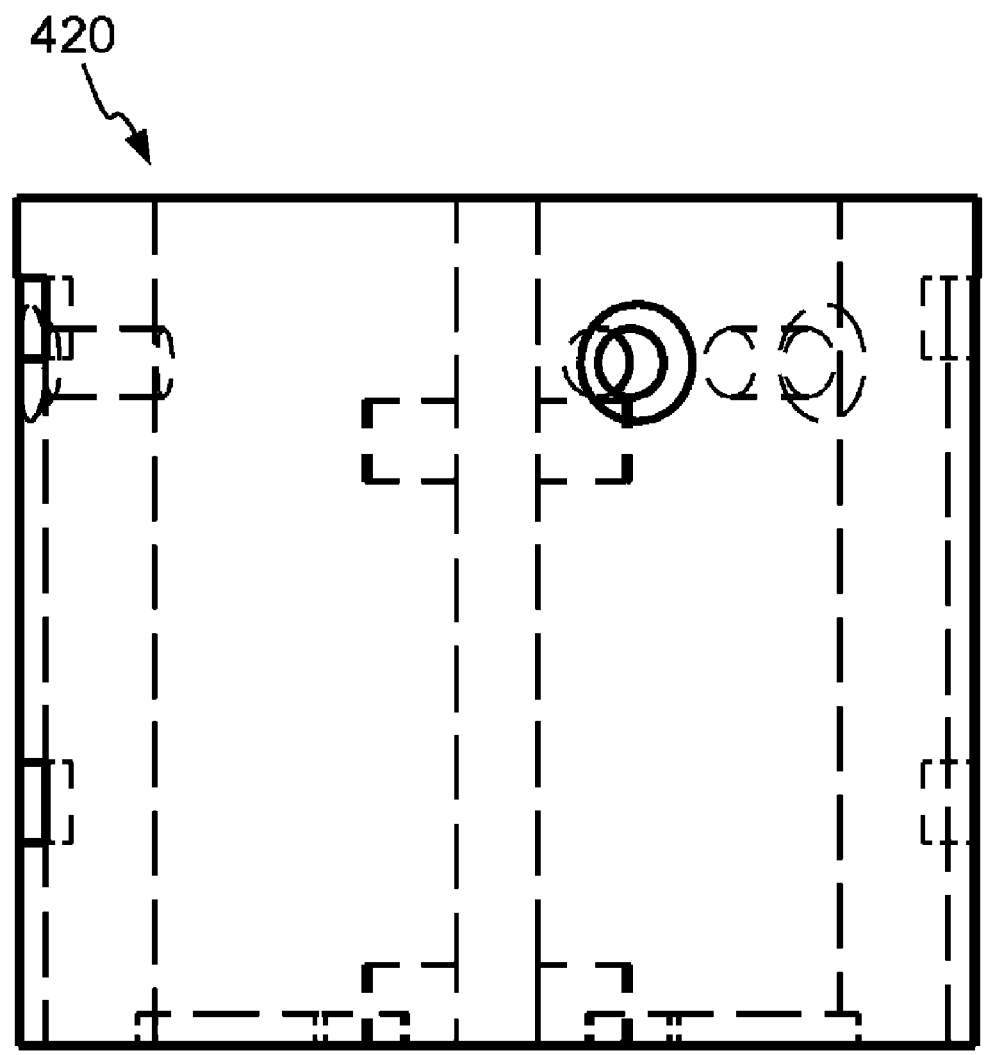
FIG. 24D shows another view ("bottom view") of the second adapter apparatus.

FIG. 24B shows a first radial view of the second adapter apparatus 420. FIG. 24C shows a second radial view of the second adapter apparatus 420. FIG. 24D shows another view ("bottom view") of the second adapter apparatus 420.

For another embodiment of the base 10, FIGS. 25A through 25D show a support tube 500 that is substantially designed as a hollow cylinder and is arranged (or arrangeable) in the base 10 concentrically to the longitudinal axis 224 of the base 10, wherein the support tube 500 is designed to bear the object 250 to be erected—in particular, the table top 200. In another embodiment, the support tube 500 is designed to bear a seat and/or a backrest of a chair, such as an office chair.

Figure 25A:
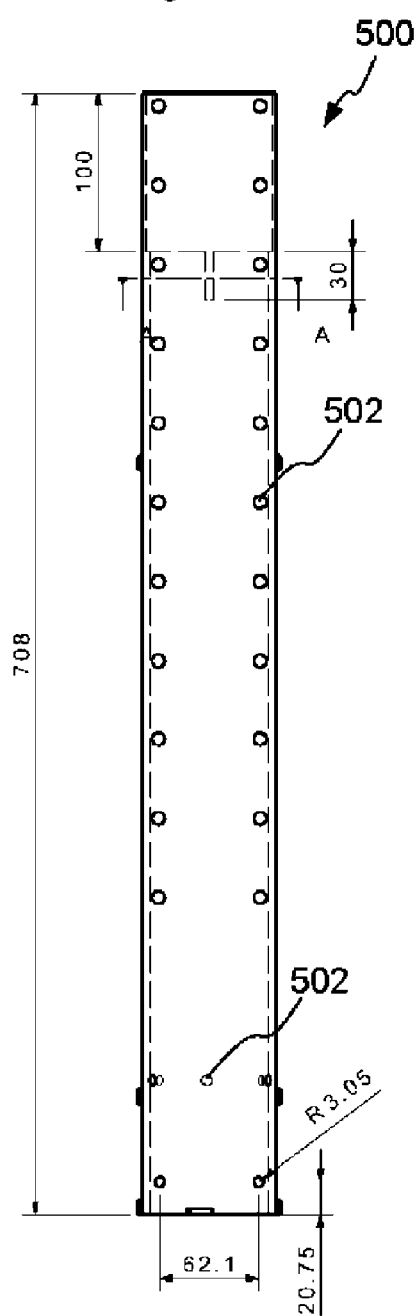
FIG. 25A shows a first axial view of a support tube for the base.
Figure 25B:
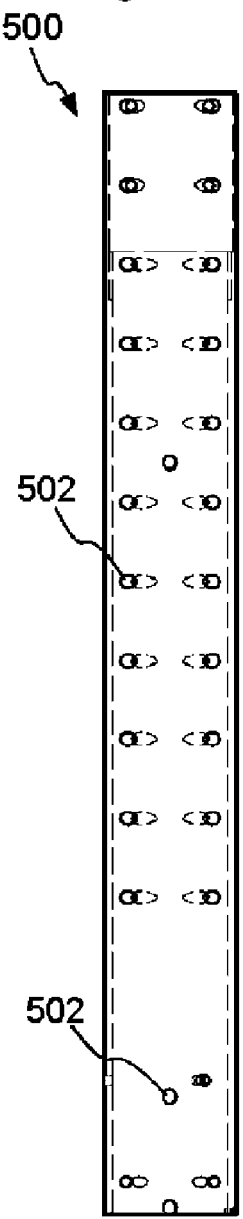
FIG. 25B shows a second axial view of the support tube.

For example, the support tube 500 has a diameter of 50 mm to 200 mm, and preferably approximately 80 mm to 90 mm. The support tube 500 has a plurality of openings 502 that each extend in radial planes of the support tube 500. As can be seen in FIGS. 25A and 25B, the openings 502 are partially center-oriented and partially non-center-oriented. A plurality of the openings of 502 are arranged in an axial grid.

By means of the opening 502, the table top 200 can, for example, be arranged and/or locked in the support tube 500—in particular, arranged and/or locked in a height-adjustable manner. For this purpose, the table top 200 has a central opening; see, for example, the embodiment of the table top 200 and FIGS. 17A through 18C.

Figure 25C:
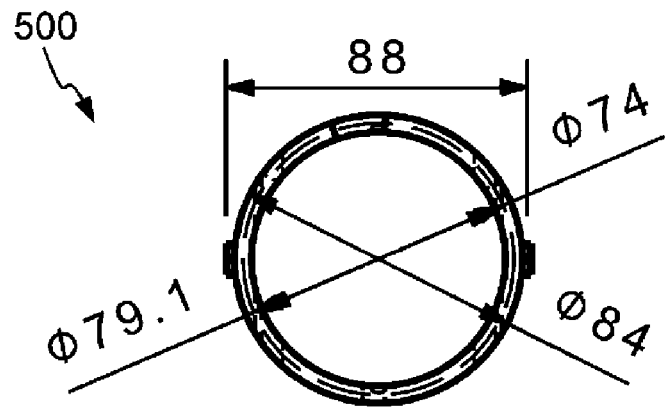
FIG. 25C shows a first radial view of the support tube.
Figure 25D:
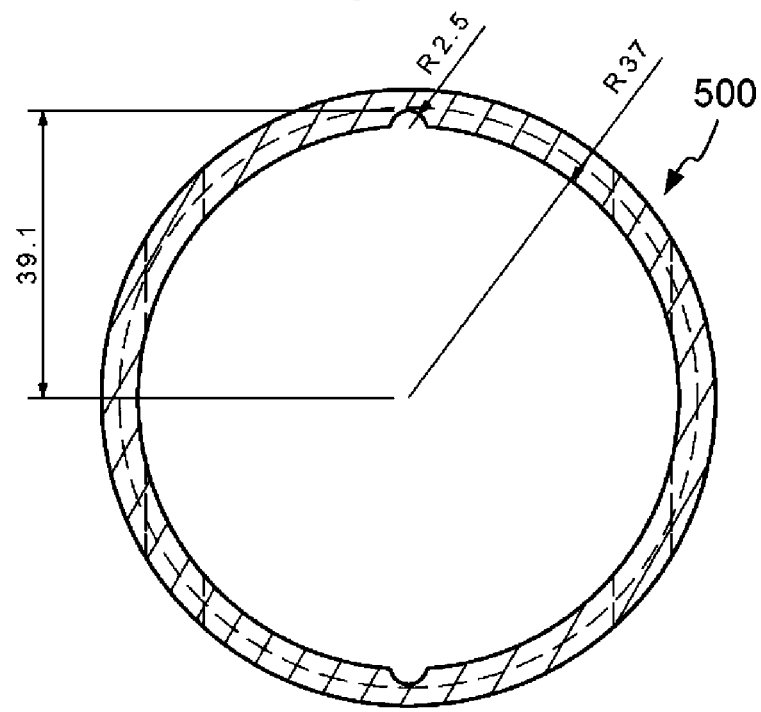
FIG. 25D shows a second radial sectional view of the support tube corresponding to line A-A from FIG. 25A.

Similar to FIG. 25A, FIG. 25B shows an axial view of the support tube 500, wherein the view in 25B is radially offset by 90°. FIG. 25C shows a radial "bottom view" of the support tube 500. FIG. 25D shows a section corresponding to a line A-A from FIG. 25A.

Preferably, an inner diameter of the support tube 500 is greater than an outer diameter of the holding tube 213 for the umbrella stand (umbrella 250) that can be arranged in the base 10, wherein the diameter of the support tube 500 is less than the diameter of the hollow cylinder 222. The base 10 according to the invention can accordingly comprise a table foot, the holding tube 213, the support tube 500, the hollow cylinder 222, and/or the table top 200.

In one embodiment of the base 10, the support tube 500 can be held in the base 10 by means of at least one adapter apparatus 400 or 420, which is designed at least approximately as a hollow cylinder. This is sketched in FIG. 26.

Figure 26:
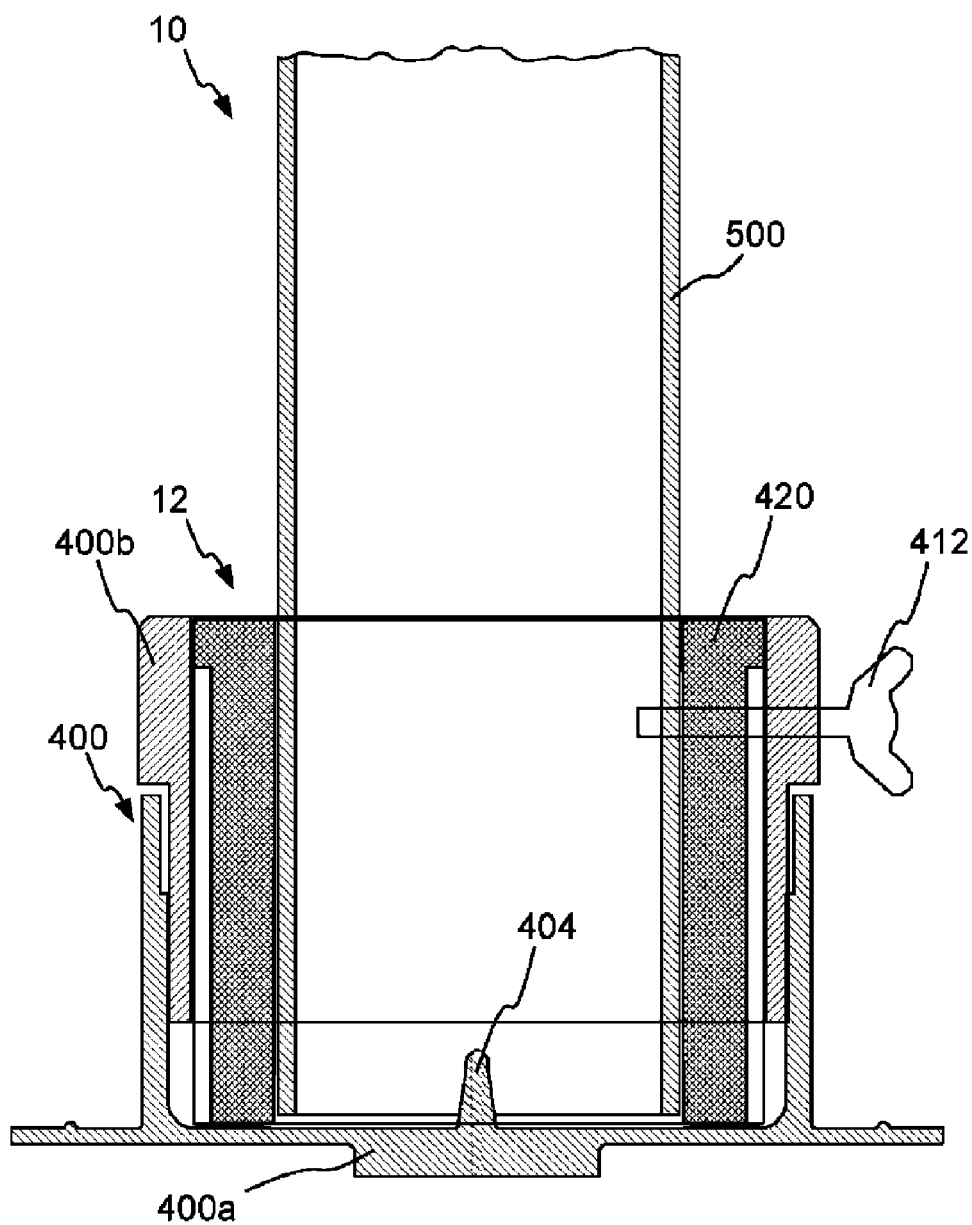
FIG. 26 shows a sketch of an arrangement of the support tube, the first adapter apparatus, and the second adapter apparatus of the base.

The embodiment according to FIG. 26 shows the bottom threaded sleeve 400a into which the top threaded sleeve 400b is screwed. Together with the top threaded sleeve 400b, the bottom threaded sleeve 400a forms the first adapter apparatus 400. The second adapter apparatus 420 (see FIGS. 24A through 24D) is arranged in a radially inner section of the top threaded sleeve 400b.

The support tube 500 is arranged in a radially inner section of the second adapter apparatus 420. A screwed connection 412 designed as a wing screw is sketched to represent a plurality of possible form fit and/or force fit connections in FIG. 26. See also the hexagonal openings 408 (FIG. 23A).

FIG. 26 also shows an embodiment of the base 10 in which the support tube 500 is held in a form fit in the base 10, and wherein the support tube 500 and/or the at least one adapter apparatus 400 and 420 are held by means of at least one screwed connection 412 in the base 10. In the present case, the holding device 12, which is only suggested in FIG. 1, comprises the elements shown in FIG. 26.

In the following, additional details of the arrangement of the table top 200 and partial tabletops 200a and 200b will be explained, in addition to the illustration of FIGS. 17A through 19C. The designations of the elements partially differ from the designations used above. However, the context establishes a reference.

In order to fasten the table tops 200 or 200a and 200b in the support tube 500, fixation in the support tube 500 that is as easy as possible to do and undo is required. To solve the problem, locking pins are used that are inserted in the holes drilled a corresponding depth into the faces of the partial table tops 200a and 200b. If only one locking pin were used, which ran directly through the middle of the support tube 500, an umbrella pole could not be placed in the middle of the support tube 500, since the table retaining pin would otherwise be in the way. If, however, two eccentric pin holes are used, an umbrella pole can be placed in the middle of the support tube 500. The clearance between the two support pins is precisely large enough for all standard umbrella poles (15-55 mm) to pass between the two support tube pins. In order to be able to use the tables in a particularly flexible manner, the holes in the support tube 500 are introduced in a grid (50 mm). This makes it possible to individually fix the height of the tabletops 200 or 200a and 200b.

An extension support tube can be introduced into the base support tube through a sleeve plug-in connection. The holes in the extension support pipe are ingeniously arranged so that the table retaining pin runs through the two mated pipes and thereby automatically secures against traction when a table top 200 or 200a and 200b is fastened in this region.

The sleeve insertion technique with the pin is particularly advantageous, since it can be installed must faster than, for example, screwed pipes. No other connecting means are visible except for the toggle-type fasteners on the bottom side of the table tops 200 or 200a and 200b recessed deep into the table tops 200 or 200a and 200b, which also lends the table tops a very delicate appearance when they have to be mounted particularly high, so that a viewer sees the bottom side of the tabletops. In addition, a particularly low stacking height of the table tops 200 or 200a and 200b during transport results. This exactly corresponds to the thickness of the table tops, since all the connecting elements are recessed into the table tops 200 or 200a and 200b.

The table top halves 200a and 200b are each provided with a groove and spring, to improve retention. If square or rectangular tabletops 200 or 200a and 200b are fastened between at least two bases 10 with one support tube 500, each with the same plug-in connection, a table can also be erected. If additional corner pieces are used, L-, T-, or U-shaped table surfaces 200 or 200a and 200b can be erected, and umbrellas 250 can then also be inserted in the support tubes 500.

If the setup surface is angled, the table can still be erected, if the leveling elements 136 have been inserted into the setup knobs on the bottom side of the base 10. The table can be individually erected at the most suitable height using the grid holes in the support tubes 500, e.g., as a dining table or high table top.

In the present case, a radially inner region of the second adapter apparatus 420 has a diameter of approximately 85 mm (see FIG. 24A). Either an umbrella handle or a holding tube 213 with a matching diameter can be placed therein, or the support tube 500. In order to securely connect the support tube 500 to the base 10, fixing screws (in particular, one or more screwed connections 412) can be screwed through the top threaded sleeve 400b and additionally through the second adapter apparatus 420 into the support tube 500. This establishes a force- and form-fit connection between all the components. The base 10 with the support tube 500 then characterizes a monolithic unit. The advantage of a large diameter of the support tube 500 is that a larger inner lever arm is highly advantageous for the transmission of force.

Preferably, there is no thread with this type of fixation in the top threaded sleeve 400b, since a screw can have problems when it is screwed into two threads at a distance from each other. Consequently, the hexagonal opening 408 and a transitional cone from the top threaded sleeve 400b to the second adapter apparatus 420 are found in the top threaded sleeve 400b. In the event that the support tube 500 is screwed to the base 10, the hexagonal opening 408 is empty, and the pin of the wing screw passes directly through the second adapter apparatus 420. If an umbrella 250 or the holding tube 213, or a Christmas tree, is erected, the second adapter apparatus 420 arranged radially to the inside is removed beforehand, and an M8 nut with a flange is inserted from the inside into the hexagonal opening 408 through which the M8 wing screw is guided. The angled flange of the speed nut makes it possible to easily remove the nut, if the second adapter apparatus 420 is used again with the support pipe 500.

FIGS. 27A through 27G show several views of a third adapter device 430 for another embodiment of the base 10, wherein the third adapter apparatus 430 has at least one radially acting clamping apparatus 440, and wherein a radial dimension of the clamping apparatus 440 can be adapted substantially smoothly.

As can be seen in FIG. 27A, an outer diameter of the third adapter apparatus 430 below the top edge is 79.1 mm in the present case. This diameter corresponds to a top inner diameter of the support tube 500 according to FIGS. 25A through 25D. Accordingly, the third adapter apparatus 430 can be arranged radially within the support tube 500 in the present case. For example, the third adapter apparatus 430 can be arranged in an end section of the support tube 500 facing away from the table foot.

Openings 432 in the third adapter apparatus 430 are accordingly arranged at an axial spacing in the adapter apparatus 430, such that they coincide with the axially arranged openings 502 in the support tube 500 in the event that the adapter apparatus 430 is completely shoved from above into the support tube 500 in a force fit and/or form fit. Accordingly, the adapter apparatus 430 can be inserted into the adapter apparatus 400, as well as into the support tube 500. The adapter apparatus 430 is affixed in the top threaded sleeve 400b by screwing in the threaded connection 412 up to a screw-in recess 433 (see FIGS. 27B, 27F, and 27G) of the adapter apparatus 430.

In the present case, the clamping apparatus 440 comprises at least one first clamping element 440a that can be coupled to the base 10—in particular, rigidly—wherein the clamping apparatus 440 comprises at least one second clamping element 440b (see FIGS. 28A and 28B) that can be arranged radially between the first clamping element 440a and the object 250 to be erected, and wherein the first clamping element 440a has a first contact surface 442a, and the second clamping element 440b has a second contact surface 442b, wherein the first and second contact surface 442a and 442b touch at least sectionally, wherein, in particular, a touching surface comprises an area of at least about 20 mm².

The first and/or second contact surface 442a and 442b preferably has a grid or fluting or the like that, for example, is designed to be wavy, sinusoidal, semicircular, saw-toothed, or triangular. Comparatively "smooth" contact surfaces 442a and 442b are also possible, wherein a given friction produces the desired effect. Alternatively or in addition, the first and/or second contact surface 442a and 442b can also have, at least sectionally, a different—in particular, an irregular and/or regular—surface structure that enables a force fit and/or form fit between the contact surfaces 442a and 442b.

In the embodiment in FIGS. 27A through 27G, the first and/or second contact surface 442a and 442b is preferably designed to be primarily flat, at least sectionally. For example, more than 90% of an overall surface of the first and/or second contact surface 442a and 442b is designed to be flat.

In the present case, the first and/or second contact surface 442a and 442b can be designed to be substantially rectangular, wherein a width of the first or the second contact surface 442a and 442b is smaller than a length of the first or the second contact surface 442a and 442b, and wherein a longitudinal axis (no reference number) of the first or second contact surface 442a and 442b preferably forms an angle with the longitudinal axis 224 of the base 10 between approximately 2° and approximately 45°—in particular, between approximately 5° and approximately 30°.

Preferably, the first and second clamping element 440a and 440b are designed at least sectionally as a so-called inclined plane, wherein these sections are designed to be complementary to each other. Compare FIG. 28B further below.

Figure 27C:
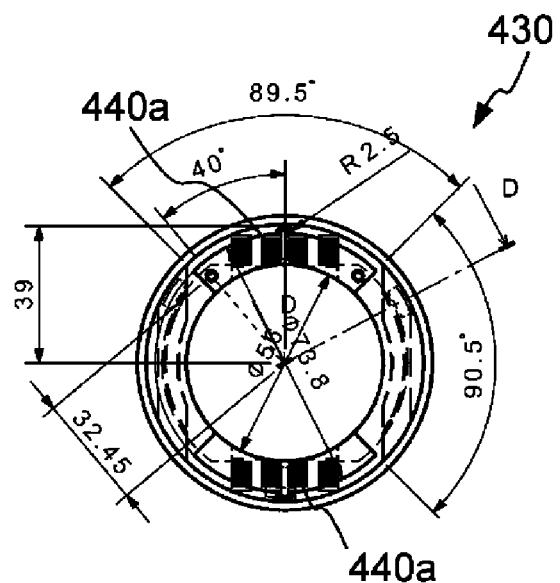
FIG. 27C shows a first radial view ("rear view") of the third adapter apparatus.
Figure 27D:
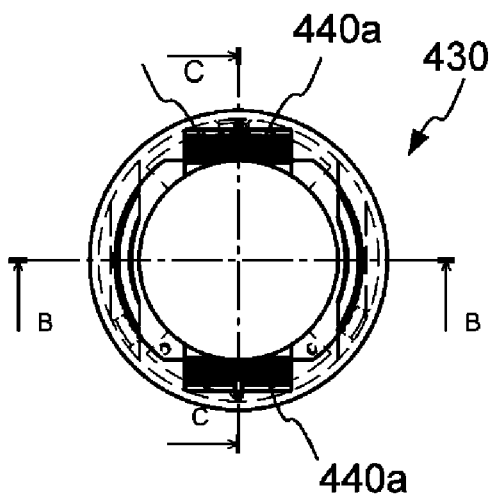
FIG. 27D shows a second radial view ("front view") of the third adapter apparatus.

FIG. 27A shows a sectional view of the third adapter apparatus 430 corresponding to a line B-B from FIG. 27D. In particular, the first contact surface 442a can be seen, which, in the present case, is divided into individual regions in a vertical direction in the drawing; compare also FIGS. 27C, 27D, and 27F. FIG. 27B shows a sectional view of the third adapter apparatus 430 corresponding to a line C-C from FIG. 27D.

Figure 27E:
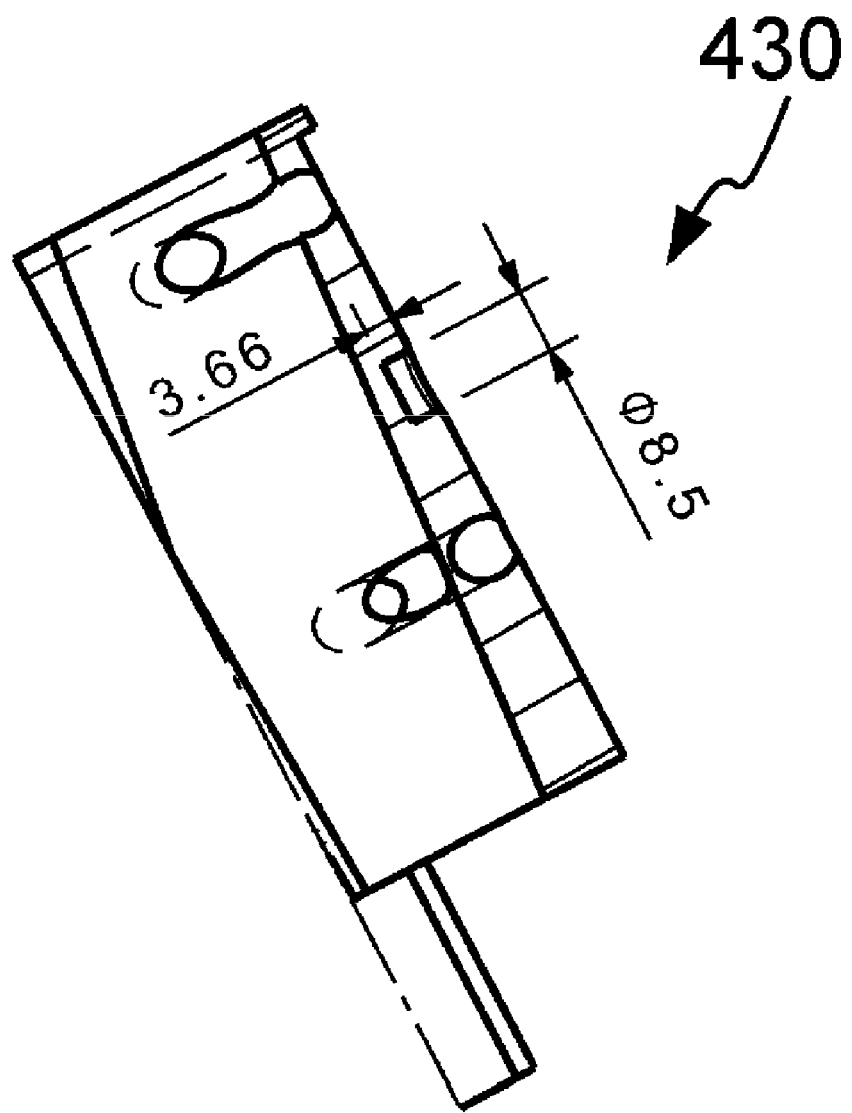
FIG. 27E shows a third axial sectional view of the third adapter apparatus corresponding to a line D-D from FIG. 27C.
Figure 27G:
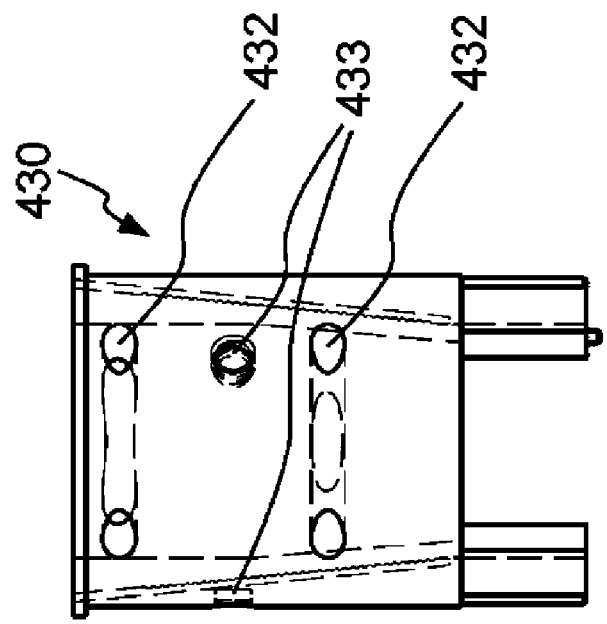
FIG. 27G shows yet another view ("auxiliary view") of the third adapter apparatus.
Figure 27F:
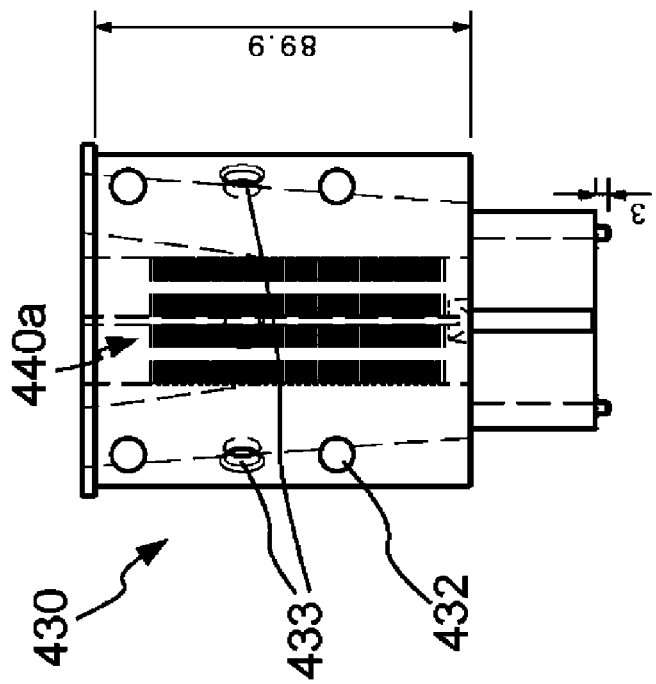
FIG. 27F shows another view ("bottom view") of the third adapter apparatus.

FIGS. 27C and 27D show a first and a second radial view of the third adapter apparatus 430. FIG. 27E shows a sectional view corresponding to a line D-D from FIG. 27C. FIG. 27F shows a "bottom view." FIG. 27G shows an auxiliary view. The scale in FIGS. 27C through 27G is smaller in comparison to FIGS. 27A and 27B.

Figure 28A:
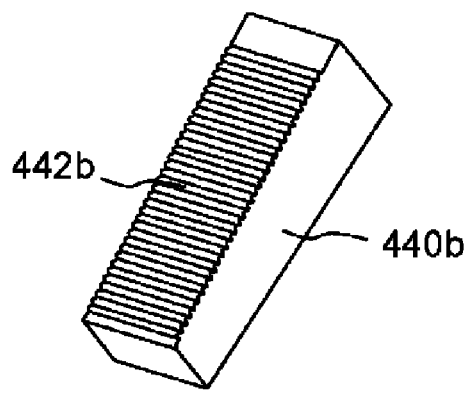
FIG. 28A shows a perspective representation of a clamping element for the third adapter apparatus.
Figure 28B:
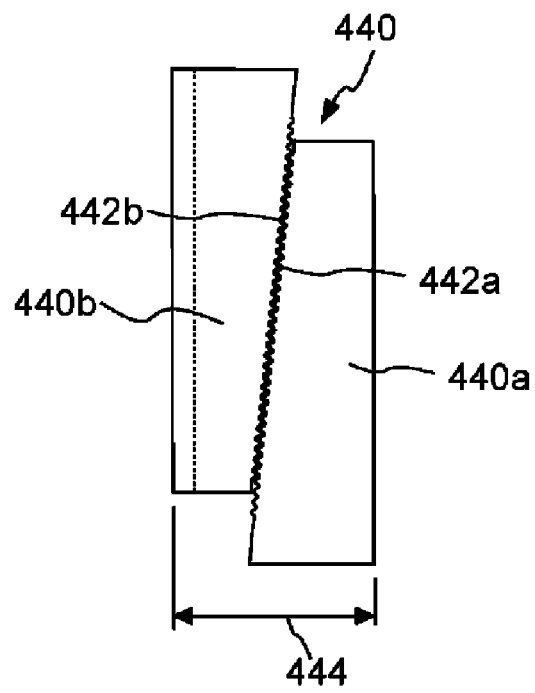
FIG. 28B shows a sketch with a first and second clamping element for the third adapter apparatus.

FIG. 28A shows a perspective view of the second clamping element 440b. FIG. 28B shows a schematic of a clamping apparatus 440, wherein a radial dimension 444 can be changed, depending upon the relative position of the clamping elements 440a and 440b.

Figure 28C:
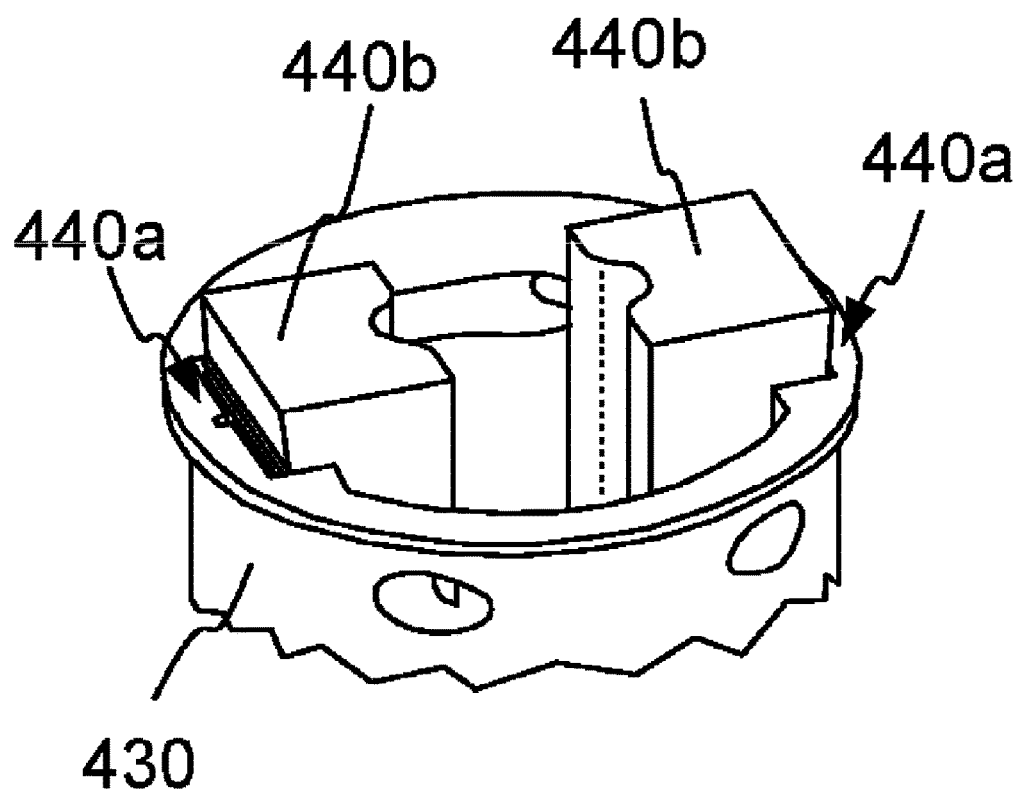
FIG. 28C shows a perspectival representation of the third adapter apparatus with two clamping apparatuses.

FIG. 28C shows a perspective view of the third adapter apparatus 430 with two second clamping elements 440b arranged in a radially inner region of the adapter apparatus 430. As can be seen, at least one surface of at least one clamping element—preferably a surface of the second clamping 440b, and, in particular, a surface opposite the first or second contact surface 442a and 442b—has a geometry of an Euler spiral, at least sectionally. The holding tube 213 can thereby be securely held, largely independently of a diameter of the holding tube 213, between the two clamping elements 440b.

The invention claimed is:

1. A base with a holding device for holding an object that is to be erected, said base comprising:
   a receiving region within an interior of the base for receiving a removable ballast weight in a receiving position, wherein the receiving position lies radially outwards, and, starting from the receiving position, at least some sections along a peripheral direction including a raised region arranged radially inwards,
   wherein the raised region includes a transport surface that borders the receiving region,
   wherein the base includes an infeed region in which the ballast weight is insertable, and the infeed region being designed such that the ballast weight moves across the transport surface into the receiving position under gravity after being inserted, and
   wherein an insertion device is arranged between the holding device and the infeed region and the insertion device has an insertion surface which substantially has the form of a lateral surface of a conical frustum and is angled overall relative to the base side between 7° and 35°.

2. The base according to claim 1, wherein the transport surface is angled at an overall angle relative to a base side between 5° and 30°.

3. The base according to claim 1, wherein the transport surface basically has the shape of a lateral surface of a conical frustum.

4. The base according to claim 1, wherein the base includes a top element and a bottom element that are releasably or unreleasably connected to each other, and the top element borders the receiving region in the direction of a top side, and the bottom element borders the receiving region in the direction of a base side.

5. The base according to claim 1, wherein a projecting region is arranged on the base side, and a recessed region is arranged on the top side and is designed to be complementary to the projecting region such that a projecting region of a substantially identical second base is insertable in the recessed region.

6. The base according to claim 1, wherein the base includes at least one primary support element that has an elastically deformable first partial body and at least one second partial body, including a ceramic material, arranged on the first partial body.

7. The base according to claim 6, wherein the base includes at least one secondary support element, wherein in an unloaded state, the primary support element extends farther out of a base plane of the base than the secondary support element.

8. The base according to claim 1, wherein the base includes a support tube designed basically as a hollow cylinder that is arranged on the base concentrically to a longitudinal axis of the base, wherein the support tube is held in the base by at least one adapter apparatus designed at least approximately as a hollow cylinder.

9. The base according to claim 1, wherein the base includes a base surface provided for being arranged on a bearing surface and a receiving surface substantially opposite the base surface, and wherein a receiving apparatus including at least one groove is arranged in the region of the receiving surface for receiving a hollow cylinder.

10. The base according to claim 9, wherein the base comprises a hollow cylinder that is received in the receiving apparatus, and wherein the base includes a table top arranged on an end section of the hollow cylinder facing away from the base.

11. The base according to claim 1, wherein the holding device includes at least one adapter apparatus for holding the object to be erected, wherein the adapter apparatus includes at least one radially acting clamping device, and wherein a radial dimension of the clamping device is adjustable basically smoothly.

12. The base according to claim 11, wherein the clamping apparatus includes at least one first clamping element, coupleable to the base, and at least one second clamping element arrangeable radially between the first clamping element and the object to be erected, wherein the first clamping element includes a first contact surface, and the second clamping element includes a second contact surface, wherein the first and second contact surfaces touch at least sectionally, and wherein a touching surface includes an area of at least about 20 mm².

13. The base according to claim 12, wherein at least one of the first and second contact surface is designed to be mostly flat, at least sectionally.

14. The base according to claim 12, wherein at least one surface of at least one clamping element has a geometry of an Euler spiral, at least sectionally.

15. A ballast weight for weighing down the base according to claim 1, comprising a plurality of ballast elements that are flexibly connectable to each other, wherein
at least two ballast elements are connected to each other by at least one connector, the ballast elements each including a through-hole, the at least one connector going through the respective through-holes of the respective ballast elements.

16. The base according to claim 1, further comprising with a ballast weight comprising a plurality of ballast elements that are flexibly connectable to each other, wherein
at least two ballast elements are connected to each other by at least one connector, the ballast elements each including a through-hole, the at least one connector going through the respective through-holes of the respective ballast elements, wherein the ballast weight is arranged in the receiving position.

17. The base according to claim 16, wherein a holding insert is arranged in the holding device and wherein the holding insert is designed as a hollow cylindrical adapter element.

* * * * *